United States Patent
Lancaster, III et al.

(10) Patent No.: US 8,474,223 B2
(45) Date of Patent: Jul. 2, 2013

(54) APPARATUS FOR LOADING AND UNLOADING BY PALLET TRUCK A WRAPPING SURFACE

(75) Inventors: Patrick R. Lancaster, III, Louisville, KY (US); Philip R. Moore, Mt. Washington, KY (US); Richard L. Johnson, La Grange, KY (US)

(73) Assignee: Lantech.com, LLC, Louisville, KY (US)

( * ) Notice: Subject to any disclaimer, the term of this patent is extended or adjusted under 35 U.S.C. 154(b) by 370 days.

(21) Appl. No.: 12/848,851

(22) Filed: Aug. 2, 2010

(65) Prior Publication Data

US 2011/0023419 A1 Feb. 3, 2011

Related U.S. Application Data

(60) Provisional application No. 61/213,962, filed on Aug. 3, 2009.

(51) Int. Cl.
*B65B 11/00* (2006.01)

(52) U.S. Cl.
USPC ................................ 53/203; 14/69.5; 14/71.1

(58) Field of Classification Search
CPC ..................................................... B65B 11/585
USPC ............................... 53/203; 14/69.5, 70, 71.1
See application file for complete search history.

(56) References Cited

U.S. PATENT DOCUMENTS

| | | | |
|---|---|---|---|
| 2,904,196 A | 9/1959 | Teixeira | |
| 2,993,315 A * | 7/1961 | Verrinder et al. | 414/416.04 |
| 3,059,587 A * | 10/1962 | Dickson et al. | 104/88.01 |
| 3,088,574 A * | 5/1963 | Verrinder et al. | 198/429 |
| 3,584,428 A * | 6/1971 | Falk | 53/434 |
| 3,640,048 A * | 2/1972 | Zelnick et al. | 53/442 |
| 3,874,302 A * | 4/1975 | Crosswhite | 104/172.3 |
| 3,896,604 A * | 7/1975 | Marantz | 53/176 |
| 5,054,987 A | 10/1991 | Thornton | |
| 5,056,653 A | 10/1991 | Lancaster | |
| 5,660,023 A * | 8/1997 | Kivela | 53/399 |
| 5,819,503 A * | 10/1998 | Lancaster, III | 53/399 |
| 6,709,329 B2 * | 3/2004 | McLeod et al. | 460/12 |
| 6,775,956 B1 * | 8/2004 | Lacey | 53/399 |
| 7,040,071 B2 | 5/2006 | Heikaus | |

(Continued)

FOREIGN PATENT DOCUMENTS

| DE | 3115936 A1 * | 11/1982 |
|---|---|---|
| DE | 3615450 A1 * | 11/1987 |
| EP | 1 489 004 B1 | 8/2006 |
| GB | 688 285 A | 3/1953 |

OTHER PUBLICATIONS

International Search Report and Written Opinion for PCT/US2010/044143 mailed Dec. 2, 2010, 12 pages.

*Primary Examiner* — Stephen F Gerrity

(74) *Attorney, Agent, or Firm* — Wood, Herron & Evans, LLP

(57) ABSTRACT

An apparatus for transferring a palletized load between a pallet truck and a load wrapping surface may include a ramp configured to support at least a portion of the pallet truck. The ramp may include at least one fixed portion. The ramp may also include a movable portion configured to move relative to the fixed portion. The movable portion may be configured to support one or more wheel assemblies of the pallet truck, and move the one or more wheel assemblies of the pallet truck relative to the fixed portion.

15 Claims, 15 Drawing Sheets

U.S. PATENT DOCUMENTS

| | | |
|---|---|---|
| 2004/0040477 A1 | 3/2004 | Neumann |
| 2006/0245869 A1 | 11/2006 | Leum |
| 2006/0260279 A1* | 11/2006 | Jafari .............................. 53/399 |
| 2007/0204565 A1 | 9/2007 | Lancaster, III et al. |
| 2007/0220830 A1* | 9/2007 | Macleod ........................ 53/441 |
| 2010/0239403 A1* | 9/2010 | Lancaster et al. ............. 414/595 |

* cited by examiner

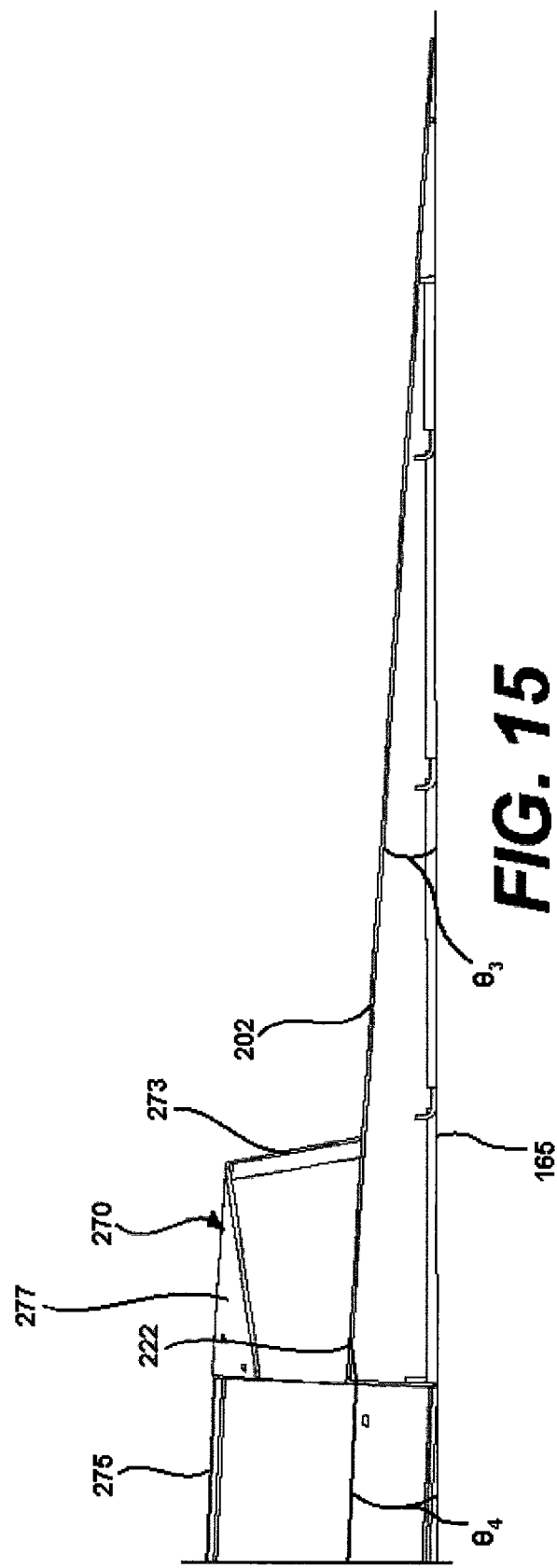

APPARATUS FOR LOADING AND UNLOADING BY PALLET TRUCK A WRAPPING SURFACE

This application claims priority under 35 U.S.C. §119 based on U.S. Provisional Application No. 61/213,962, filed Aug. 3, 2009, the complete disclosure of which is incorporated herein by reference.

TECHNICAL FIELD

The present disclosure relates to conveyorized wrapping systems, and more particularly, to methods and apparatuses for loading and unloading by pallet truck.

BACKGROUND

Distribution centers use relatively common processes to pick products and load trucks with those products, for delivery to other locations. These products are typically stacked or otherwise arranged to form a load. The products may be placed on a pallet, forming a palletized load. A pallet is normally constructed with a top plate and at least a partial bottom plate. For example, the bottom plate may include a plurality of boards spaced apart from one another. The bottom plate supports the palletized load when it is stacked on top of another load. Pallets are preferably constructed of wood, but alternatively may be made of plastic. Plastic pallets generally have a series of "legs" rather than a bottom plate. The pallets are typically constructed to industry standards. Sometimes, pallets may be leased from a pallet supplier.

A palletized load can be carried on tines of a fork of a pallet truck. The tines are cantilevered off of the pallet truck, but may include retractable wheels on or near their distal ends. When retracted, the retractable wheels may be contained within the tines or otherwise flush with the external surfaces of the tines. With the retractable wheels in their retracted positions, the tines of the fork can be more easily inserted into and extracted from tunnels or holes located between the top and bottom plates of the pallet. After the tines are inserted through the tunnels, the retractable wheels may be, for example, hydraulically lowered. As the retractable wheels pass through openings in the bottom plate of the pallet and engage the ground, a lifting force is exerted on the top plate of the pallet by the tines of the fork, thus raising the palletized load off of the ground. When the palletized load is ready for dropping off, the retractable wheels are retracted, causing the tines of the fork to lower, thus lowering the palletized load toward the ground.

Often times, palletized loads are wrapped for transportation, storage, containment, stabilization, protection, and waterproofing. Various packaging techniques and wrapping apparatuses have been used to wrap palletized loads. One system uses stretch wrapping machines to stretch, dispense, and wrap stretch packaging material around a palletized load. Stretch wrapping can be performed as an inline automated packaging technique which dispenses and wraps packaging material in a stretched condition around products arranged on a pallet to cover and contain the products. Stretch wrapping, whether accomplished by turntable, rotating arm, or rotating ring, typically covers the vertical sides of the palletized load with a stretchable film such as polyethylene film. In each of these arrangements, relative rotation is provided between the palletized load and a packaging material dispenser to wrap packaging material about the sides of the palletized load.

Palletized loads must somehow be transported to the wrapping apparatus, and then placed in a wrapping area of the wrapping apparatus. In order to increase efficiency and reduce the number of bottlenecks, conventional conveyors may be used to transport unwrapped palletized loads to the wrapping areas of the wrapping apparatuses. By using conveyors, pallet trucks can be more efficient since they can drop loads off at the conveyor and then leave to pick up other loads, allowing the conveyor to transport waiting loads to a wrapping area. Using conventional conveyors, however, may present problems. One problem is that pallet trucks are unable to lift the unwrapped palletized loads high enough to place them onto conventional above-floor conveyors. Conveyors with lift tables or elevators are available to automate the process. However, such devices require a large amount of space and are mechanically complex and costly to maintain. In addition, conveyors have been placed in pits created in the floor to lower the conveyor to be approximately level with the floor. This requires a large amount of space and the permanent destruction of the floor. In addition, such a process is costly.

Ramp type solutions, including those having a ramp leading up to a level conveyor, have not proven feasible due to the type of lift mechanisms found on pallet trucks. The tines of a pallet truck fork are typically around 3 inches thick, and occupy most of the space between the top and bottom plates of pallets (the space being around 3.5 to 4.5 inches, typically). When a pallet truck's front wheels are retracted to assist with extraction of the tines from a pallet's tunnels, the bottom surfaces of the tines will lower. If the fork is lowered to place a palletized load on a level conveyor while the pallet truck is on a ramp, the lowering of the tines can cause the tines to wedge against the top and/or bottom plates of the pallet in the pallet's tunnels, thus binding the tines to the pallet, due at least in part to misalignment between the tines and the surface of the level conveyor. FIG. 1 shows a fork in various states of insertion in a pair of pallets. The fork wedges against the top plates of the pallets as it moves between a state in which the fork is partially inserted and a state in which the fork is fully inserted. The position of the fork at full insertion is represented in FIG. 1 by the tip portion of the fork on the left (near a middle section of the leftmost pallet). Accordingly, due to the widespread use of pallet trucks, manufacturers have not been able to successfully employ either powered or non-powered conveyors to automated wrapping operations, and distribution centers have not been able to fully harness efficiency gains associated with using conveyors and automate wrapping operations.

Solutions requiring conveyor cut-outs, as demonstrated in FIG. 2, have not proven feasible for pallets with bottom plates. One reason is that as a pallet with a bottom plate is loaded onto the conveyor, the pallet truck's fork may continue down into the cutout while moving to its lowered position. This movement of the fork may break the portion of the bottom plate positioned above the cut-out, since the fork will force that portion into the cut-out while the conveyor supports the side portions of the pallet at a height higher than the cutout. Dropping the conveyor to floor-height to avoid this breaking is not desirable for at least the reasons discussed above.

In light of these drawbacks, there is a need to reduce the complexity, time, and number of material handling steps necessary to move palletized loads to and from a wrapping apparatus in a simple, reliable, and inexpensive manner.

SUMMARY

According to one aspect of the present disclosure, an apparatus for transferring a palletized load between a pallet truck and a load wrapping surface may include a ramp configured to support at least a portion of the pallet truck. The ramp may include at least one fixed portion. The ramp may also include a movable portion configured to move relative to the fixed portion. The movable portion may be configured to support one or more wheel assemblies of the pallet truck, and move the one or more wheel assemblies of the pallet truck relative to the fixed portion.

According to another aspect of the present disclosure, an apparatus for transferring a palletized load between a pallet truck and a load wrapping surface may include a ramp configured to support at least a portion of the pallet truck. The ramp may include at least one fixed portion. The ramp may also include a movable portion configured to move relative to the fixed portion. The movable portion may be configured to support one or more wheel assemblies of the pallet truck, and move the one or more wheel assemblies of the pallet truck relative to the fixed portion. The apparatus may also include a conveyor adjacent to the ramp. The conveyor may be configured to convey the palletized load between the ramp and the load wrapping surface.

According to another aspect of the present disclosure, an apparatus for transferring a palletized load between a pallet truck and a load wrapping surface may include an inclined ramp configured to support at least a portion of the pallet truck. The apparatus may also include an inclined conveyor adjacent to the ramp. The conveyor may include a conveying surface configured to support the palletized load. The conveying surface may include at least one drag chain assembly configured to convey the palletized load between the ramp and the load wrapping surface.

According to another aspect of the present disclosure, a method of transferring a load from a pallet truck to a conveyor may include moving the pallet truck onto a ramp including at least one fixed portion and a movable portion configured to move relative to the fixed portion. The method may also include moving the movable portion and a wheel assembly of the pallet truck relative to the fixed portion in a direction substantially transverse to the direction of movement of the pallet truck. The method may also include, subsequent to moving the movable portion and the wheel assembly, directing the pallet truck along the ramp to position the load over at least a portion of the conveyor.

According to another aspect of the present disclosure, a method of positioning a loaded pallet on a fork of a pallet truck for placement on a conveyor may include carrying the loaded pallet on the fork of the pallet truck. The method may also include engaging the loaded pallet with at least one guiding surface of at least one guide rail. The method may also include moving the loaded pallet relative to the fork with the at least one guide rail before the pallet is deposited on the conveyor.

According to another aspect of the present disclosure, a conveyorized wrapping system for conveying and wrapping a load may include a wrapping area configured to wrap the load with packaging material. The conveyorized wrapping system may also include an infeed area. The infeed area may include a first ramp configured to support at least a portion of the pallet truck. The first ramp may include at least one fixed portion and a movable portion configured to move relative to the fixed portion. The movable portion may be configured to support one or more wheel assemblies of the pallet truck, and move the one or more wheel assemblies of the pallet truck relative to the fixed portion. The infeed area may also include a first conveyor adjacent to the first ramp. The first conveyor may be configured to convey the load between the first ramp and the wrapping area.

According to another aspect of the present disclosure, a conveyorized wrapping system may include an infeed area. The infeed area may include an inclined ramp configured to support at least a portion of the pallet truck. The infeed area may also include an inclined conveyor adjacent to the inclined ramp. The inclined conveyor may include a conveying surface configured to support a load. The conveying surface may include at least one drag chain assembly configured to convey the load between the inclined ramp and a wrapping area. The wrapping area may include a wrapping apparatus configured to wrap the load with packaging material.

According to another aspect of the present disclosure, a method of wrapping a load may include carrying a load on a fork of a pallet truck. The method may also include moving the pallet truck onto a ramp including at least one fixed portion and a movable portion configured to move relative to the fixed portion. The method may further include moving the movable portion and a wheel assembly of the pallet truck relative to the fixed portion in a direction substantially transverse to the direction of movement of the pallet truck. The method may also include, subsequent to moving the movable portion and the wheel assembly, directing the pallet truck along the ramp to position the load over at least a portion of a first conveyor. The method may further include lowering the fork of the pallet truck to place the load onto the first conveyor. The method may also include conveying the load to a wrapping area with the first conveyor. The method may further include wrapping the load with packaging material while the load is in the wrapping area.

According to another aspect of the present disclosure, a method of wrapping a load may include carrying a load on a fork of a pallet truck. The method may also include moving the pallet truck onto an inclined ramp. The method may further include positioning the load over at least a portion of an inclined conveyor. The method may also include lowering the fork of the pallet truck to place the load onto one or more drag chains on the inclined conveyor. The method may further include conveying the load to a wrapping area with the one or more drag chains. The method may further include wrapping the load with packaging material while the load is in the wrapping area.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

FIG. 15 shows a side view of a portion of the infeed area of FIG. 12.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

The present disclosure is related to conveyorized wrapping systems and methods for wrapping and conveying loads, and in particular palletized loads. A conveyorized wrapping system may include three areas: an infeed area, a wrapping area, and an outfeed area. An unwrapped palletized load may be dropped off at the infeed area by a pallet truck. The unwrapped palletized load may be conveyed downstream through the infeed area to the wrapping area for wrapping, after which the wrapped palletized loads may be conveyed downstream away from the wrapping area to the outfeed area. The wrapped palletized loads may be conveyed downstream through the outfeed area, where they may be picked up by a pallet truck and transported to another location. "Upstream" and "downstream," as used in this application, are intended to define a direction of movement relative to the movement of palletized loads through the conveyorized wrapping system. Thus, since palletized loads move from the infeed area to the outfeed area, movement toward the infeed area and against the movement of the palletized load through the conveyorized wrapping system is defined as "upstream," and movement away from the infeed area and with the movement of the palletized load through the conveyorized wrapping system is defined as "downstream."

The infeed area may include an infeed ramp and an infeed conveyor. The infeed ramp and the infeed conveyor may extend in an inclined manner toward the wrapping area. The infeed ramp and the infeed conveyor may be sized and configured so that a pallet truck can be driven onto the infeed ramp to position an unwrapped palletized load above the infeed conveyor, the pallet truck can lower its fork to lower the unwrapped palletized load onto the infeed conveyor, and the pallet truck can withdraw its fork from the pallet of the unwrapped palletized load. The infeed conveyor may convey the unwrapped palletized load to the wrapping area for wrapping. Additional features of the infeed area are described in U.S. patent application Ser. No. 12/729,942, entitled "METHODS AND APPARATUSES FOR LOADING AND UNLOADING BY PALLET TRUCK," filed Mar. 23, 2010, the entire disclosure of which is incorporated herein by reference.

Figure 3:
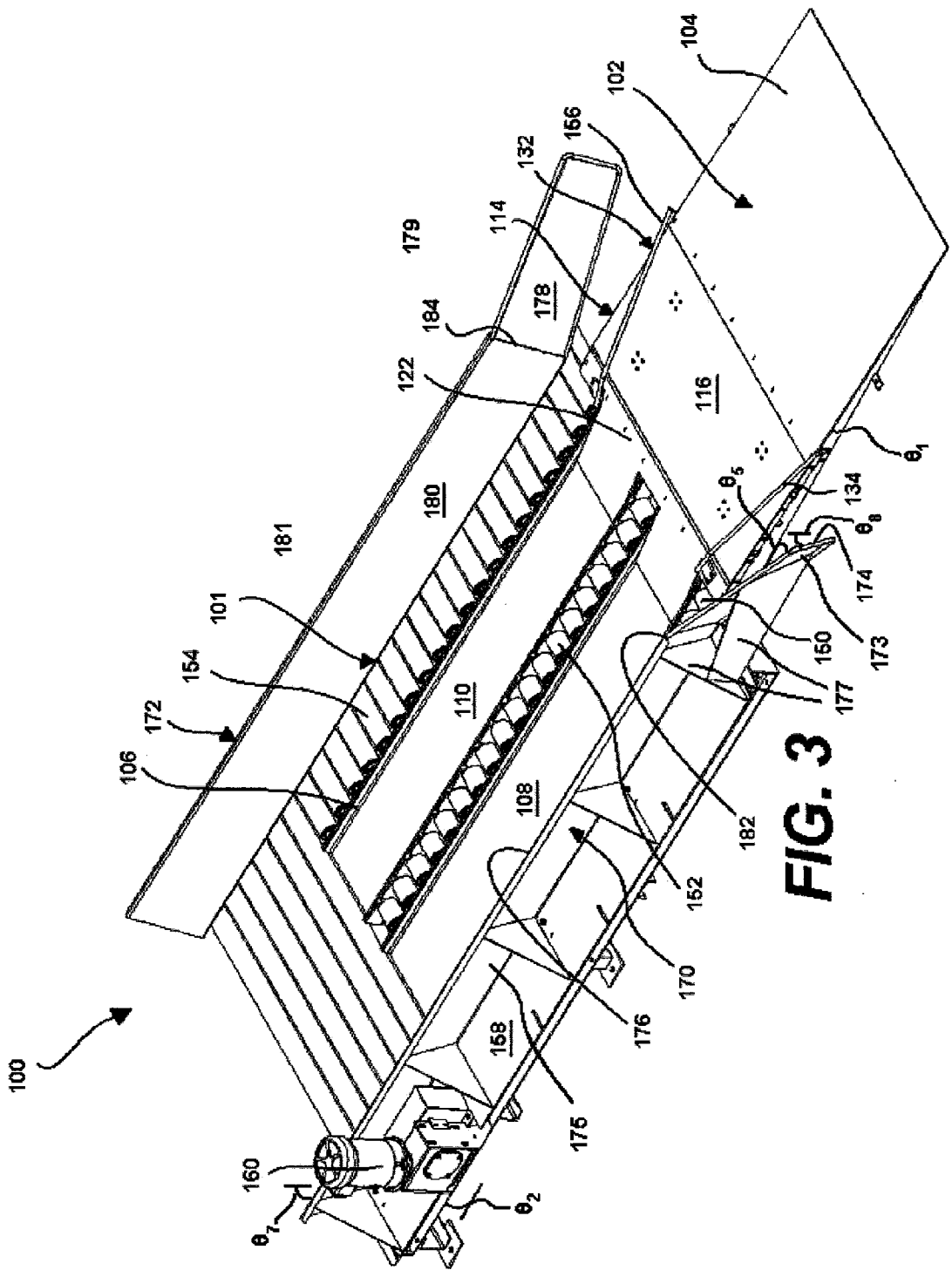
FIG. 3 shows an isometric view of an infeed area, according to an aspect of the present disclosure.
Figure 4:
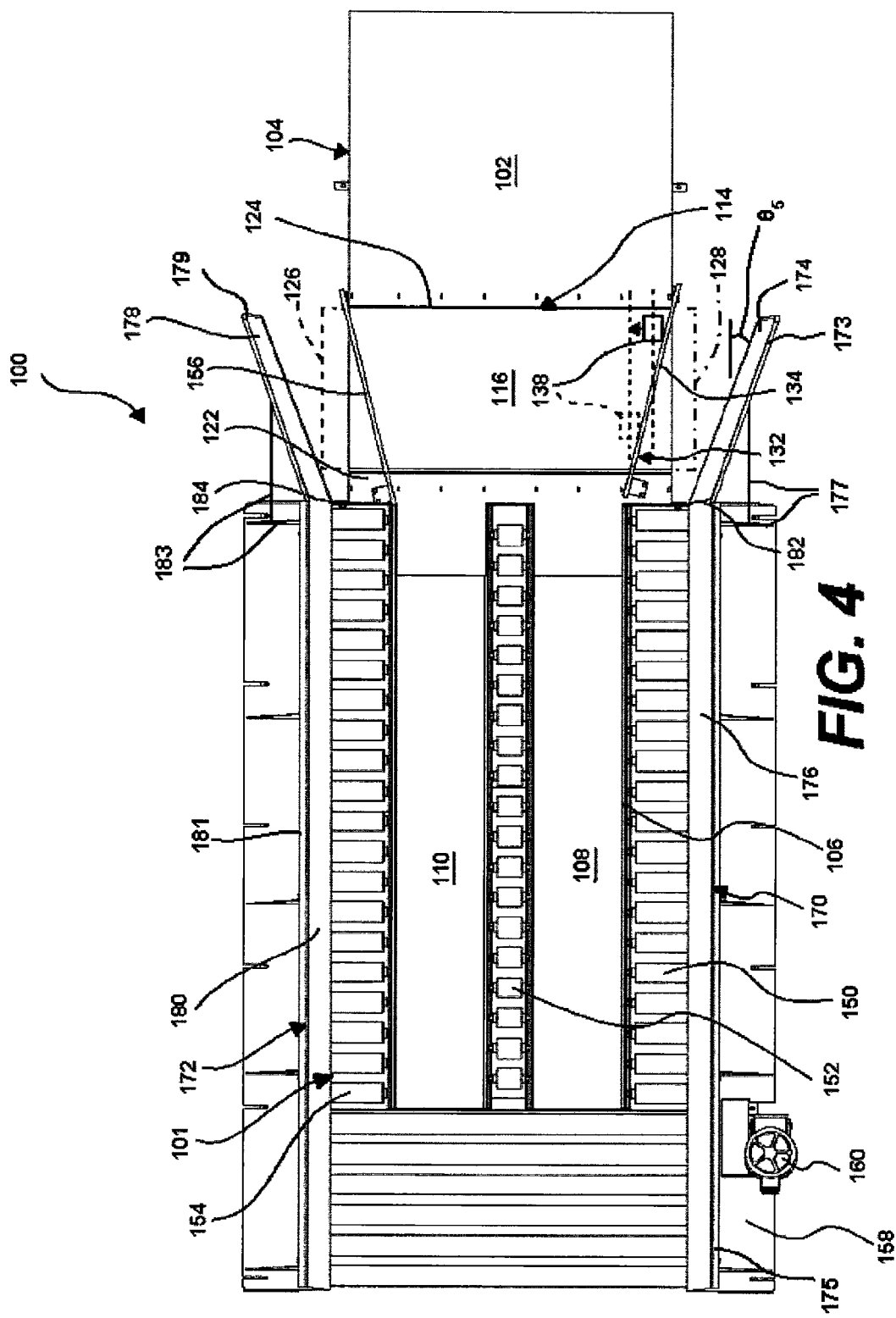
FIG. 4 shows a top view of the infeed area of FIG. 3.
Figure 5:
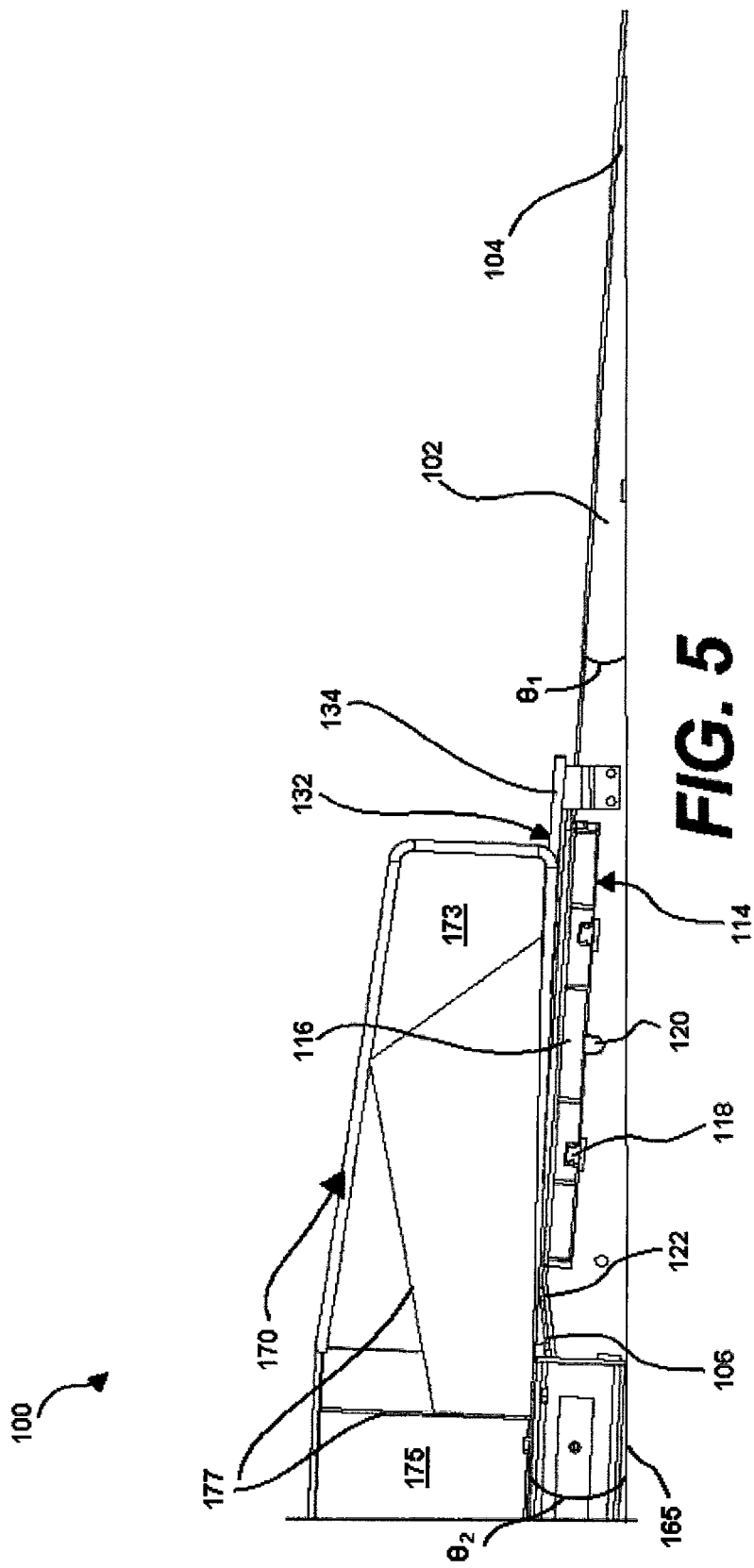
FIG. 5 shows a side view of a portion of the infeed area of FIG. 3.

One embodiment of an infeed area 100 of a conveyorized wrapping system is shown in FIGS. 3-5. Infeed area 100 includes an infeed ramp 102 including an upstream fixed portion 104, a downstream fixed portion 106 including left and right side portions 108 and 110 extending into an infeed conveyor 101, and a movable portion 114.

A top surface of infeed ramp 102 may form an angle $\theta_1$ with a support surface 165, which may include the floor or any other suitable support surface. The exact value of angle $\theta_1$ may depend on a number of factors, including, for example, dimensions of a pallet supporting a palletized load, dimensions of a fork of a pallet truck, dimensions of an infeed conveyor in infeed area 100, and other variables. According to one exemplary embodiment, infeed ramp 102 may have an angle $\theta_1$ of between approximately 2 and 4 degrees. For example, if infeed ramp 102 has a length of approximately 60.6 inches, angle $\theta_1$ may be approximately 3.58 degrees. If infeed ramp 102 has a length of approximately 62.0 inches, angle $\theta_1$ may be approximately 2.4 degrees.

Movable portion 114 is configured to move transversely with respect to upstream and downstream fixed portions 104 and 106. Movable portion 114 includes a plate 116, one or more wheel, roller, or bearing assemblies 118 mounted below and supporting plate 116, and a biasing assembly 120.

Plate 116 may have a substantially rectangular shape. The longer edges of plate 116 are substantially flush with opposing edge portions of upstream and downstream fixed portions 104 and 106. The top surface of plate 116 may include at least one protrusion 122. Protrusion 122 may be sized and configured such that near the end of a step in which the fork of a pallet truck is extracted from a pallet supporting a palletized load, with the pallet resting on an infeed conveyor of the infeed area, protrusion 122 may engage a bottom surface of the fork as the fork exits from tunnels in the pallet so that the fork does not damage a bottom plate of the pallet near the entrance to the tunnels. It is contemplated that an upstream portion of protrusion 122 may be inclined at an angle relative to a top surface of infeed ramp 102 that is different than, or alternatively equal to, the angle at which the top surface of infeed ramp 102 is inclined relative to support surface 165. It is also contemplated that the downstream portion of protrusion 122 may have a decline with respect to support surface 165. For example, the angle of decline of protrusion 122 with respect to support surface 165 may be approximately 6.42 degrees. Protrusion 122 may include features of any of the protrusions described in U.S. patent application Ser. No. 12/729,942, and may function in a similar manner.

Plate 116 is movably supported by the one or more wheel, roller, or bearing assemblies 118. Plate 116 may ride the one or more wheel, roller, or bearing assemblies 118 from a home position 124, shown using solid lines in FIG. 4, toward a second position 126, shown using dashed lines. It is also contemplated that plate 116 may also ride the one or more wheel, roller, or bearing assemblies 118 toward a third position 128, shown using dashed and dotted lines. Biasing assembly 120 includes one or more springs or similar devices (not shown) configured to bias plate 116 back to its home position 124 when forces pushing plate 116 toward second position 126 or third position 128 are overcome by the biasing force exerted on plate 116 by biasing assembly 120.

Figure 6:
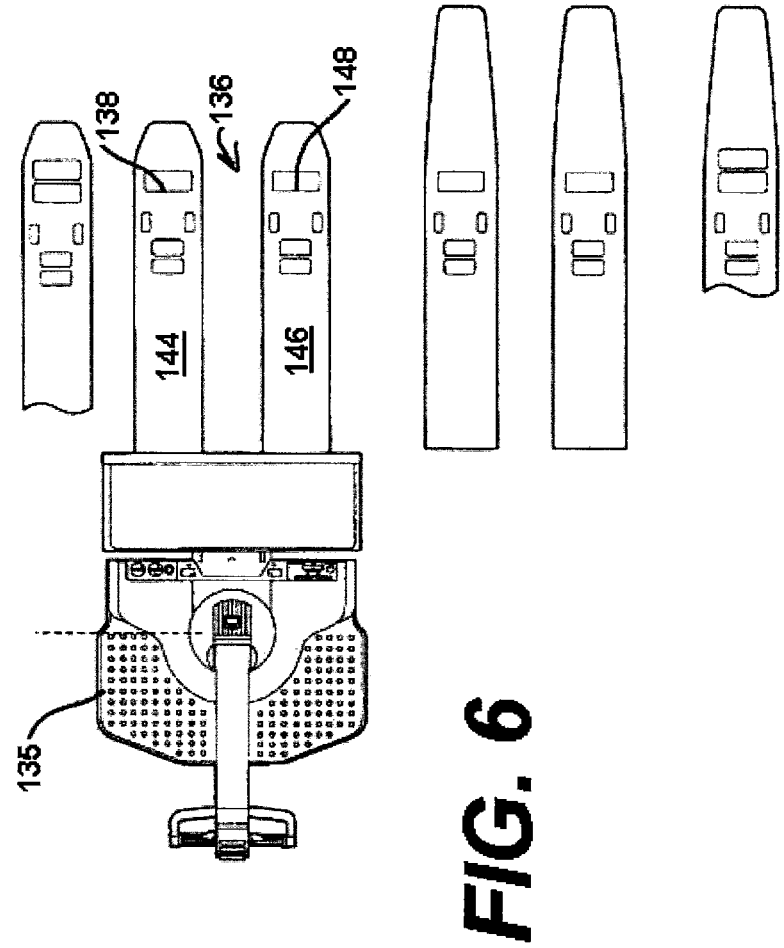
FIG. 6 shows a top view of a pallet truck with various options for fork construction.
Figure 7:
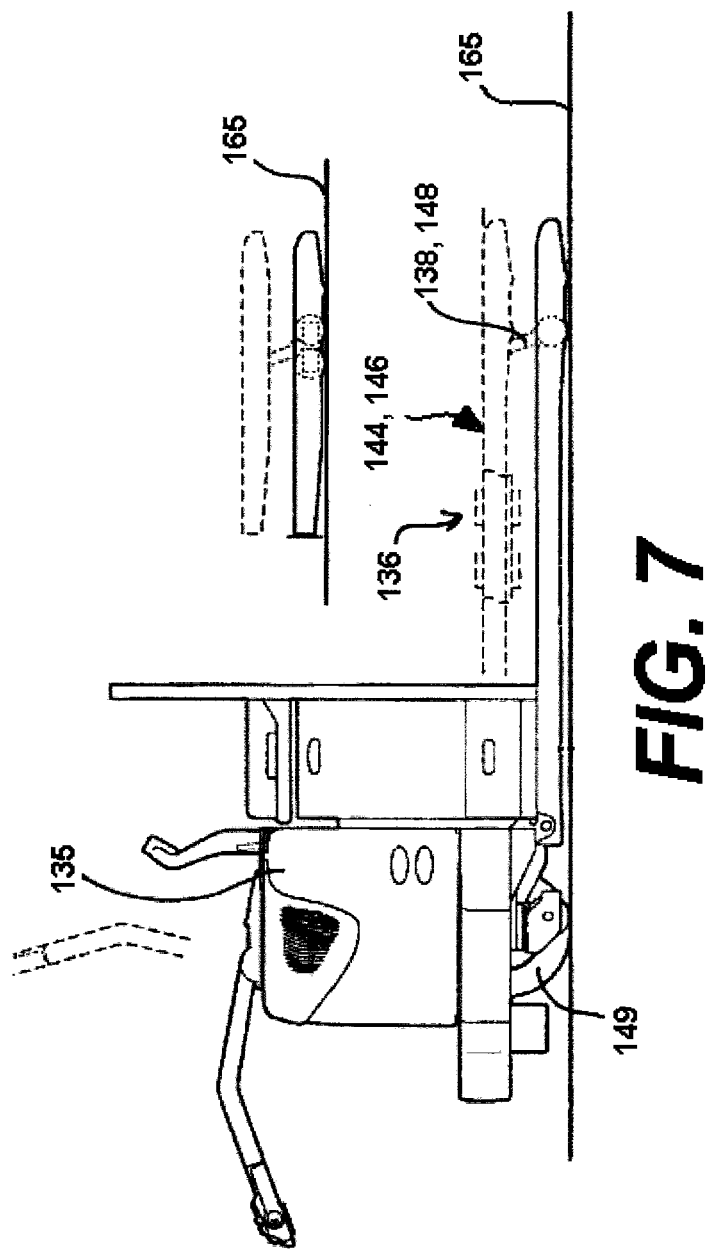
FIG. 7 shows a side view of the pallet truck of FIG. 6.

A guide means 132 may extend over the top surface of plate 116. Guide means 132 includes, for example, a guide bar 134. Guide bar 134 is mounted at its downstream end to infeed ramp 102. Guide bar 134 may be cantilevered and free from coupling to plate 116, and as such, plate 116 may move freely with respect to guide bar 134. Guide bar 134 is positioned at a height above the top surface of plate 116 that allows guide bar 134 to engage a wheel assembly of a pallet truck, such as wheel assemblies 138 and 148 of a pallet truck 135 shown in FIGS. 6 and 7. Pallet truck 135 includes a fork 136 including tines 144 and 146. Wheel assembly 138 may be withdrawn into and extended out of a cavity in tine 144, and wheel assembly 148 may be withdrawn into and extended out of a cavity in tine 146. Alternatively, guide means 132 may include a cantilevered block, rail, track, and/or other guide means positioned above the top surface of plate 116, that is suitable for engaging wheel assemblies 138 and 148.

It is contemplated that guide bar 134 may be approximately one-eighth of an inch above the top surface of plate 116, allowing guide bar 134 to be clear of pallet 116 while not being so high as to interfere with fork 136 of pallet truck 135. Guide bar 134 may have a substantially round cross-section having, for example, an approximately 0.5 inch diameter, to ensure that guide bar 134 is strong enough to withstand forces exerted by pallet truck 135, without being so large as to interfere with fork 136. Exact dimensions may vary based on a number of factors, including, for example, the physical characteristics of wheel assemblies 138 and 148, fork 136, and other components of pallet truck 135. Moreover, guide bar 134 may have other forms, including, for example, a rectangular cross-section. It is also contemplated that at least a portion of guide bar 134 may be angled with respect to an edge of ramp 102 by an angle of approximately 14 degrees. While the length of guide bar 134 may vary depending on the angle at which guide bar 134 is angled, the length of guide bar 135 may be selected to ensure that it spans the length of plate 116.

Figure 8:
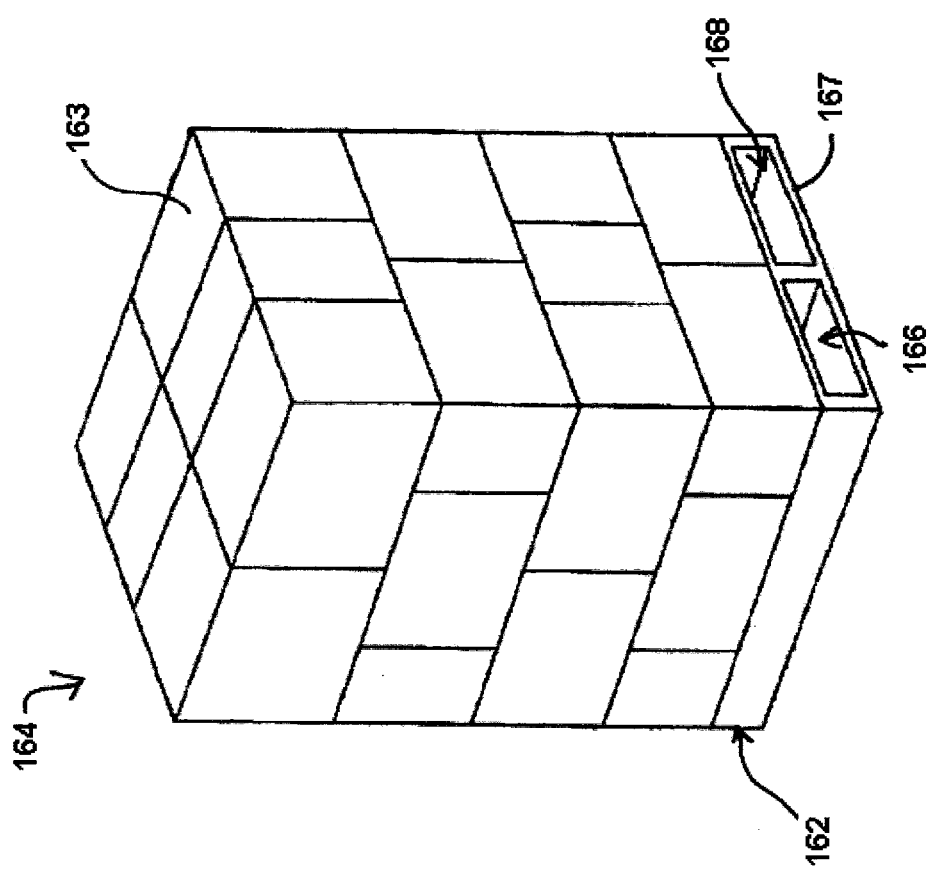
FIG. 8 shows an isometric view of a palletized load.

Movable portion 114, together with guide bar 134, may adjust the position of fork 136 as pallet truck 135 travels up infeed ramp 102 to help ensure that pallet truck 135 is properly aligned with infeed conveyor 101. By doing so, movable portion 114 and guide bar 134 prevent wheel assemblies 138 and 148 from coming into contact with rollers 150, 152, and 154 of infeed conveyor 101 by lining up wheel assemblies 138 and 148 with left and right side portions 108 and 110, respectively, and also prevents a palletized load 164, such as the one shown in FIG. 8, from being deposited in an undesirable position on infeed conveyor 101. An undesirable position may be one that results in palletized load 164 being loosely wrapped or frequent film breaks during wrapping, or one that prevents palletized load 164 from engaging as many of rollers 150, 152, and 154 as possible.

As pallet truck 135 drives up infeed ramp 102, if pallet truck 135 is too far to the left in FIG. 4, wheel assembly 138 may come into contact with guide bar 134 instead of continuing onward onto rollers 150. Guide bar 134 may exert a force on wheel assembly 138 toward the right. The force of friction between wheel assemblies 138 and 148 and plate 116 prevent wheel assemblies 138 and 148 from sliding toward the right on plate 116 even though guide bar 134 is exerting a force on wheel assembly 138 in that direction. Instead, guide bar 134 will force plate 116, with wheel assemblies 138 and 148 thereon, toward the right (i.e., toward second position 126). Due to the angled orientation of guide bar 134, as pallet truck 135 continues up infeed ramp 102, guide bar 134 may continue to push plate 116 further right. The movement of plate 116 and fork 136 to the right improves the alignment between fork 136 and infeed conveyor 101.

A second guide bar 156, similar to the guide bar 134 and oriented in a mirror-image fashion to the guide bar 134, is mounted toward the right side of infeed conveyor 101 such that if pallet truck 135 is driven up infeed ramp 102 too far to the right in FIG. 4, the guide bar 156 may push plate 116 and fork 136 toward the left (i.e., toward third position 128) to align fork 136 with infeed conveyor 101. Guide bars 134 and 156 may funnel wheel assemblies 138 and 148 away from contact with rollers 150, 152, and 154 of infeed conveyor 101, and away from the side edges of infeed ramp 102, in this fashion.

In addition to including rollers 150, 152, and 154, infeed conveyor 101 also includes a frame 158 and a drive mechanism 160. By improving the alignment between fork 136 of pallet truck 135 and infeed conveyor 101, guide bars 134 and 156 help to prevent interference between wheel assemblies 138 and 148 of pallet truck 135 and rollers 150, 152, and 154 of infeed conveyor 101, allowing rollers 150, 152, and 154 to be rotated by drive mechanism 160 to convey palletized load 164 downstream on infeed conveyor 101.

The top or conveying surface of infeed conveyor 101 may form an angle $\theta_2$ with support surface 165. Angle $\theta_2$ may be substantially equal to angle $\theta_1$. Alternatively, angle $\theta_2$ may be slightly different than angle $\theta_1$. As with angle $\theta_1$, the exact value of angle $\theta_2$ may depend on a number of factors, including, for example, dimensions of a pallet supporting a palletized load, dimensions of a fork of a pallet truck, dimensions of infeed ramp 102, and other variables. According to one exemplary embodiment, infeed conveyor 101 may have an angle $\theta_2$ of between approximately 2 and 4 degrees. For example, if infeed ramp 102 has a length of approximately 62.0 inches, angle $\theta_2$ may be approximately 2.4 degrees, and infeed conveyor 101 may have a pass height of approximately 3.25 inches. The pass height may be equal to a distance between support surface 165 and the top or conveying surface of infeed conveyor 101. If infeed ramp 102 has a length of 60.6 inches (along support surface 165), and infeed conveyor 101 has a length of approximately 97.5 inches (along support surface 165), angle $\theta_1$ and angle $\theta_2$ may be approximately 3.58 degrees and 2.50 degrees respectively, and infeed conveyor 101 may reach a height of approximately 7.5 inches at its downstream end adjacent the wrapping area. Other features of infeed conveyor 101 are similar to those described in U.S. patent application Ser. No. 12/729,942.

In some instances, even after fork 136 has been repositioned by plate 116, guide bar 134, and/or guide bar 156, the palletized load 164 carried on fork 136 may arrive misaligned at infeed conveyor 101. Depositing the palletized load 164 in its misaligned state may cause the palletized load 164 to be improperly positioned during wrapping in the wrapping area or may make it difficult for infeed conveyor 101 to convey the palletized load 164 to the wrapping area. The palletized load 164 may be improperly positioned if, for example, the upstream and/or downstream facing surfaces of the palletized load 164 are not substantially parallel to the rotational axes of rollers 150, 152, and 154. This may result in the palletized load 164 being loosely wrapped, or frequent film breaks during wrapping. Thus, positioning palletized load 164 properly may result in better wrapping and less downtime. Another way the palletized load 164 may be improperly positioned is if, for example, the palletized load 164 is not resting on one or more of rollers 150, 152, and 154. Conveying palletized load 164 is accomplished most efficiently when palletized load is in contact with all three rollers 150, 152, and 154, and less efficiently when in contact with two or one of the three rollers. Thus, positioning palletized load 164 to engage as many of rollers 150, 152, and 154 as possible may lead to more efficient (e.g., faster) conveying of palletized load 164.

Figure 9:
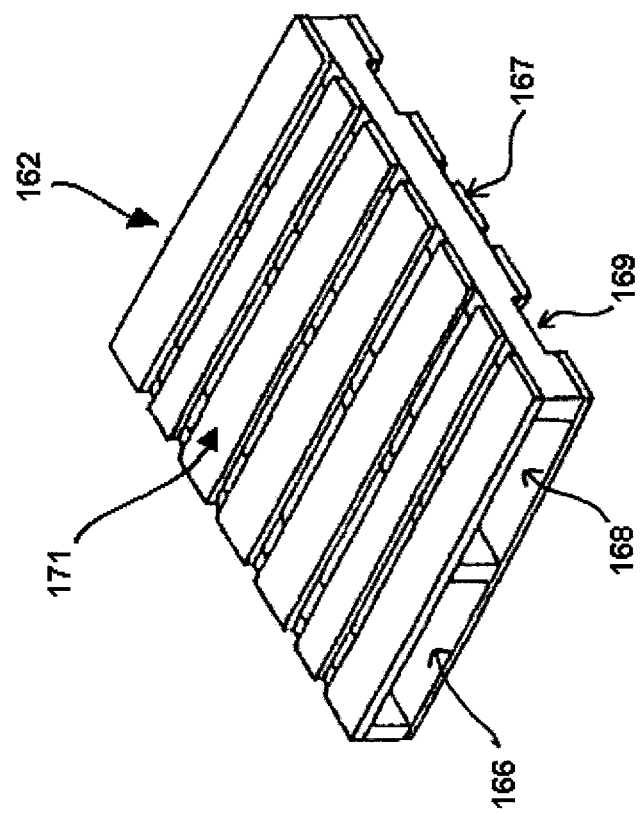
FIG. 9 shows an isometric view of a pallet.

The palletized load 164 may arrive misaligned for a number of reasons, including, if pallet truck 135 travels up infeed ramp 102 at an angle or off to one side, instead of substantially straight up the middle of infeed ramp 102. Additionally or alternatively, misalignment may arise when fork 136 is inserted through a pallet 162 such that tines 144 and 146 are angled with respect to the longitudinal axes of tunnels 166 and 168 of a pallet 162 (shown in FIGS. 8 and 9). Under such conditions, guide rails 170 and 172 may guide pallet 162 as the palletized load 164 is carried over and/or lowered onto infeed conveyor 101 to help correct any misalignment before the palletized load 164 comes to rest on the top or conveying surface of infeed conveyor 101. Guide rails 170 and 172 may be made of wood, steel, or any other suitable materials. It is contemplated that surfaces of guide rails 170 and 172 may include a finish, a coating, an attached panel, an inlay, and/or any other suitable construction configured to reduce friction when coming into contact with pallet 162. Guide rails 170 and 172 may reach a height of approximately 8 inches above the top or conveying surface of infeed conveyor 101. The height may be selected based on how high the bottom of pallet 162 is above the top or conveying surface of infeed conveyor 101 when fork 136 of pallet truck 135 is in a raised position, to ensure that guide rails 170 and 172 can properly guide pallet 162, and thus, palletized load 164. Guide rails 170 and 172 may have a length approximately equal to a length of infeed conveyor 101, and may be angled with respect to support surface 165 by the same angle that infeed conveyor 101 is angled with respect to support surface 165.

Guide rail 170 may be provided on a first side of infeed conveyor 101 and infeed ramp 102. Guide rail 170 may include plates 173 and 175 and one or more supporting members 177 configured to support plates 173 and 175. Plate 173 may extend alongside the upstream end of infeed conveyor 101. Plate 175 may extend along a first side of the top or conveying surface of infeed conveyor 101 adjacent rollers 150.

Guide rail 170 may include a guiding surface 174 (formed by a surface of plate 173) that is angled by an angle $\theta_8$ with respect to a substantially vertical plane extending substantially perpendicularly from a top surface of the infeed ramp 102, and a guiding surface 176 (formed by a surface of plate 175) that is angled by an angle $\theta_7$ with respect to a substantially vertical plane extending substantially perpendicularly from the top or conveying surface of the infeed conveyor 101.

Figure 10:
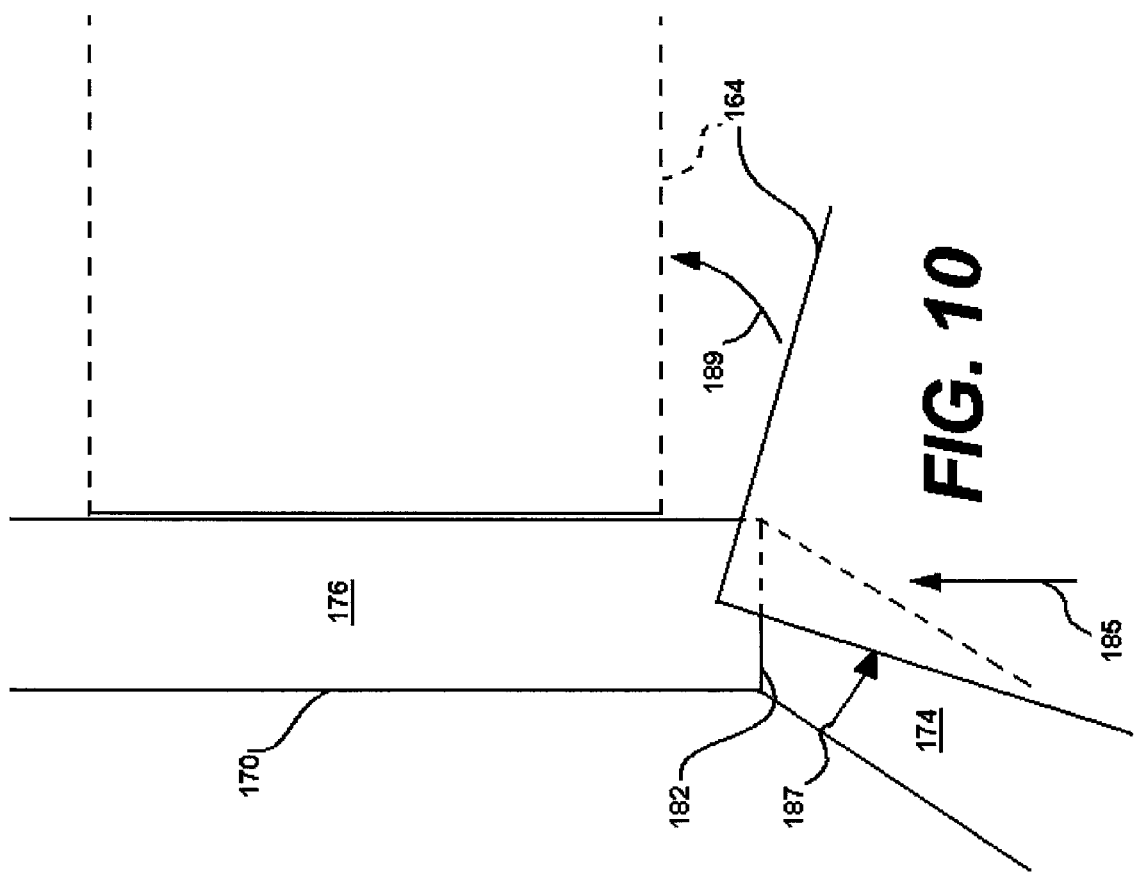
FIG. 10 shows a top view of a portion of the infeed area of FIG. 3 configured to reposition a palletized load.

In one embodiment, angle $\theta_8$ may be approximately 30 degrees, and thus, guiding surface 174 may form an approximately 30 degree angle with respect to the substantially vertical plane. If the palletized load 164 is misaligned when pallet truck 135 is carrying palletized load 164 along infeed ramp 102, an edge and/or corner of pallet 162 may come into contact with guiding surface 174. For example, pallet truck 135 may carry palletized load 164 in the direction of an arrow 185 in FIG. 10. Guiding surface 174 may exert a force, identified by an arrow 187, on the edge and/or corner of pallet 162 that may move pallet 162 on tines 144 and 146 of pallet truck 135 in the direction of an arrow 189, as pallet truck 135 carries palletized load 164 upstream from infeed ramp 102 to above infeed conveyor 101. As pallet 162 moves, the original misalignment decreases, and upstream and/or downstream facing surfaces of the palletized load 164 will move closer to or become substantially parallel to the rotational axes of rollers 150, 152, and 154. The angle $\theta_8$ that guiding surface 174 forms with the substantially vertical plane may help to ensure that even with overhanging loads (ones where one or more products resting on pallet 162 extend past an outer edge of the top surface of pallet 162), guiding surface 174 may only contact pallet 162, and not products 163 resting thereon.

Figure 11:
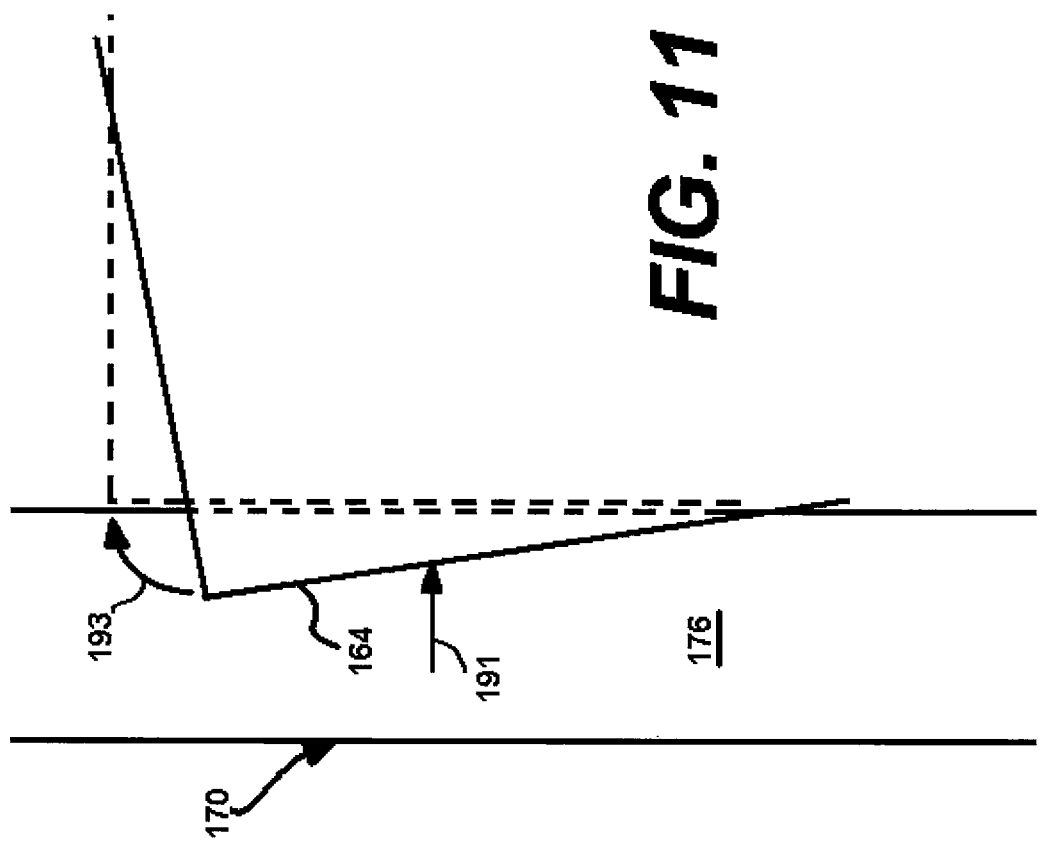
FIG. 11 shows a top view of another portion of the infeed area of FIG. 3 configured to reposition a palletized load.
Figure 12:
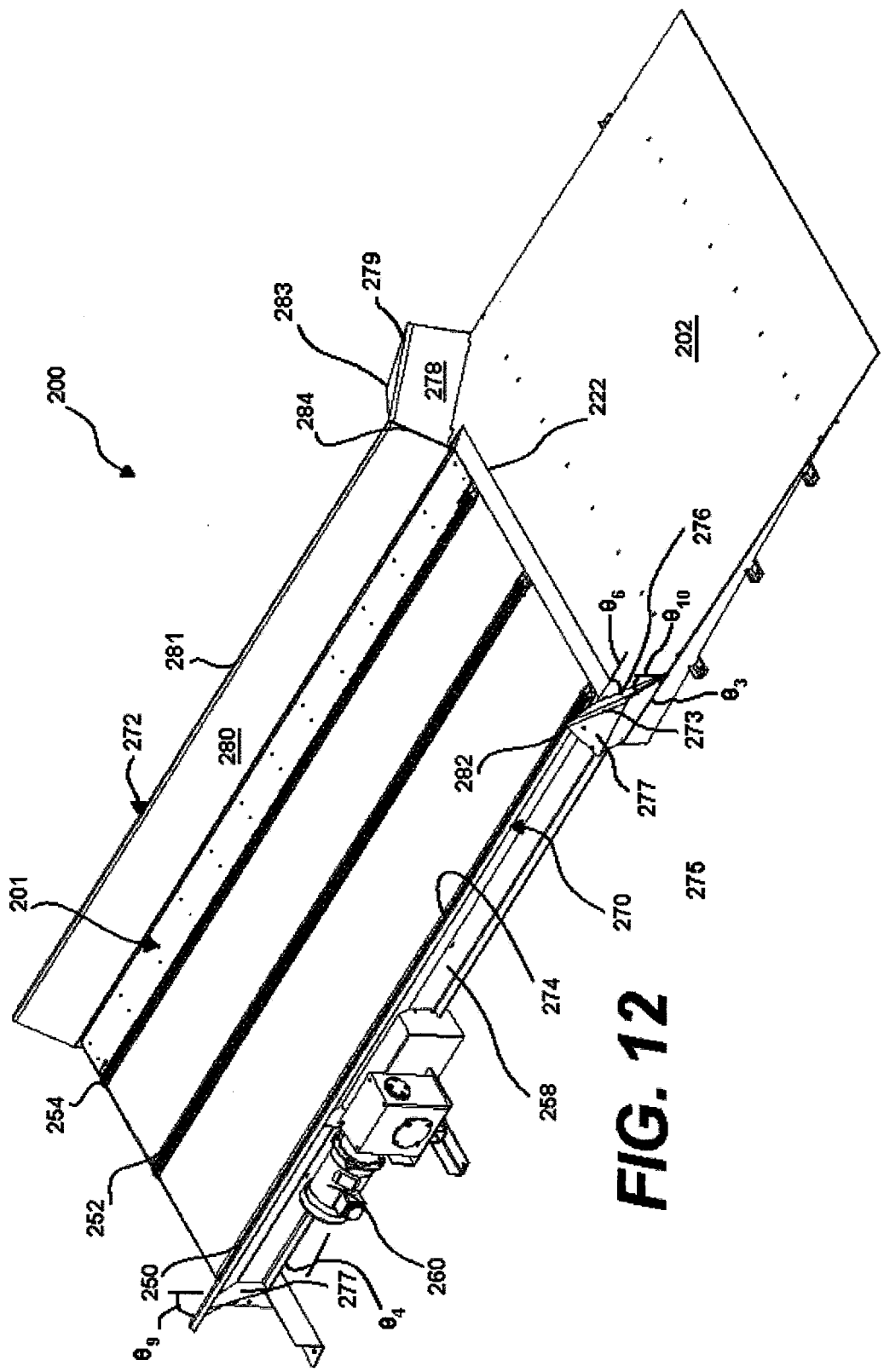
FIG. 12 shows an isometric view of an alternative infeed area, according to an aspect of the present disclosure.
Figure 13:
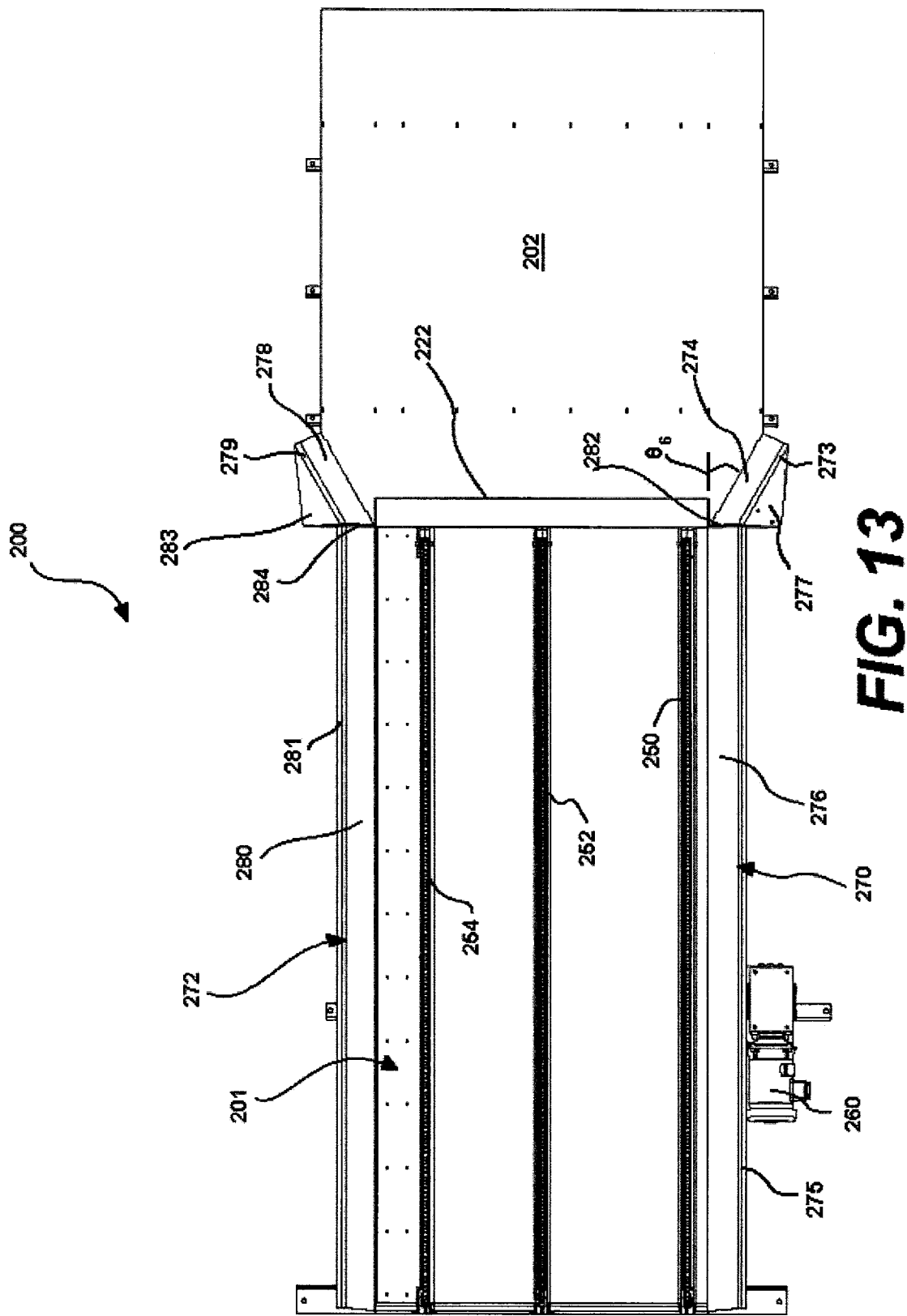
FIG. 13 shows a top view of the infeed area of FIG. 12.
Figure 14:
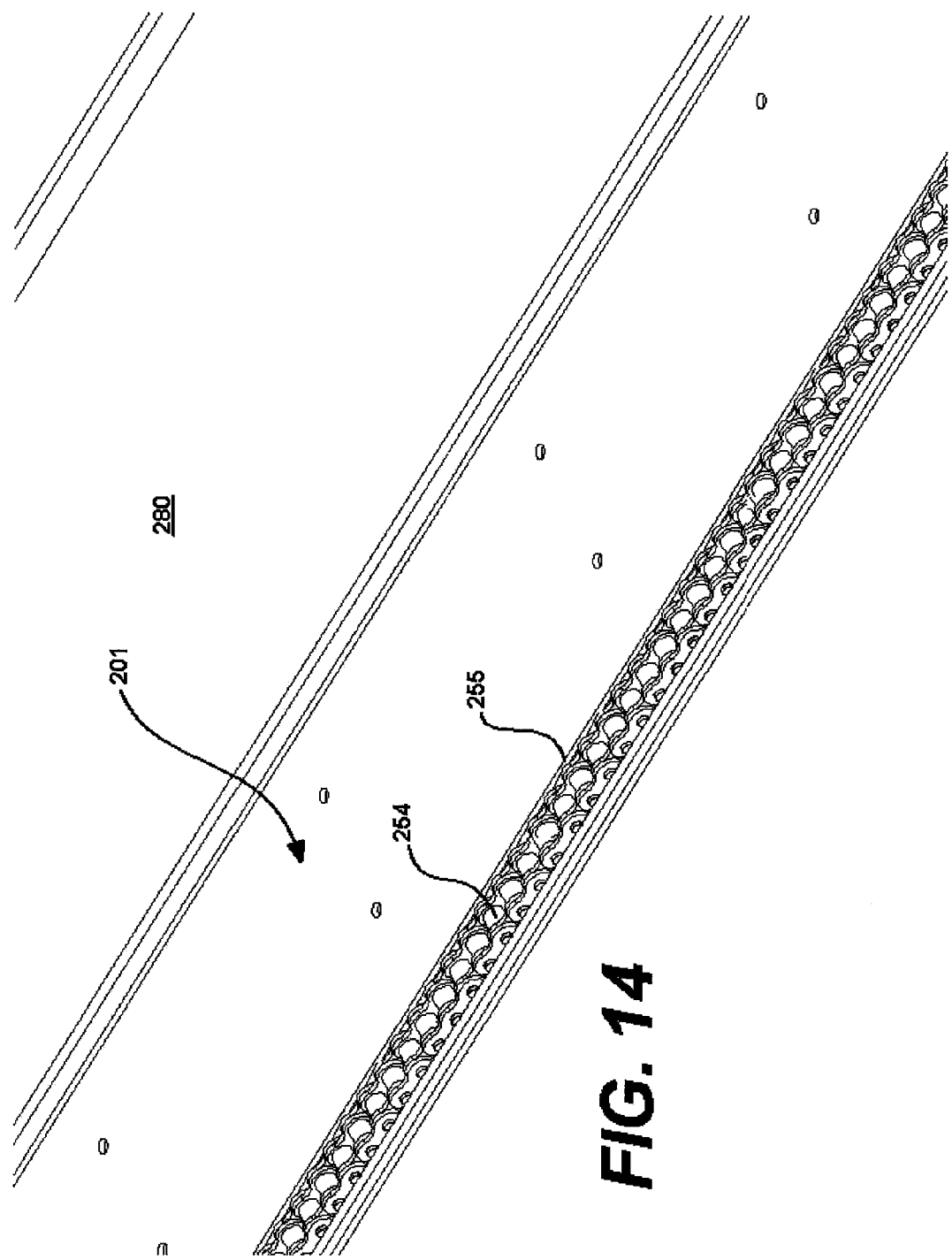
FIG. 14 shows a close up view of a portion of the infeed area of FIG. 12.

In one embodiment, angle $\theta_7$ may be approximately 30 degrees, and thus, guiding surface 176 may form an approximately 30 degree angle with the substantially vertical plane. It is also contemplated that guiding surface 174 may form an angle $\theta_5$ with respect to guiding surface 176. For example, angle $\theta_5$ may be approximately 20 to 30 degrees, and thus, guiding surface 174 may form an approximately 20 to 30 degree angle with respect to guiding surface 176. If, after pallet 162 makes it past guiding surface 174 and remains or somehow becomes misaligned when fork 136 of pallet truck 135 carries palletized load 164 over infeed conveyor 101, an edge or corner of pallet 162 may lie vertically above guiding surface 176. As the palletized load 164 is lowered in a substantially vertical direction, the edge or corner of pallet 162 may come into contact with guiding surface 176. The edge or corner of pallet 162 may slide downward along guiding surface 176. As the edge or corner of pallet 162 slides downward along guiding surface 176, guiding surface 176 may exert a force in the direction of an arrow 191 on the edge or corner of pallet 162 that may move pallet 162 on tines 144 and 146 of pallet truck 135 in the direction of an arrow 193, into proper alignment, as demonstrated in FIG. 11. The angle $\theta_7$ that guiding surface 176 forms with the substantially vertical plane may help to ensure that even with overhanging loads, guiding surface 176 may only contact pallet 162, and not products 163 resting thereon. The angle $\theta_7$ may also help to ensure that the coefficient of friction between guiding surface 176 and pallet 162 is small enough to allow sliding of pallet 162 on guiding surface 176, rather than binding, since binding could cause palletized load 164 to tip over on its side as pallet 162 engaged guiding surface 176.

Guide rail 172 may be mounted on a second side of infeed conveyor 101 and infeed ramp 102 opposite the first side and in a mirror-image orientation to guide rail 170. Guide rail 172 may include plates 179 and 181, one or more supporting members 183, and guiding surfaces 178 and 180 to guide pallet 162 in a manner similar to guide rail 170.

It is contemplated that guide rails 170 and 172 may operate individually to align palletized load 164. For example, in some instances, as pallet truck 135 carries palletized load 164 up infeed ramp 102, palletized load 164 may be misaligned such that a lower left portion of pallet 162 may contact guiding surface 174 and/or guiding edge 182. As guiding surface 174 and/or guiding edge 182 engages the lower left portion of pallet 162, palletized load 164 may rotate and/or shift with respect to fork 136 of pallet truck 135. If misalignment persists after pallet 162 has proceeded past guiding surface 174 and guiding edge 182, the remaining misalignment may be reduced or eliminated by guiding surface 176. For example, if the lower left portion of pallet 162 is above guiding surface 176 as palletized load 164 is being lowered onto infeed conveyor 101, when the lower left portion makes contact with guiding surface 176, palletized load 164 will rotate and/or shift with respect to fork 136, and the misalignment may be reduced or eliminated.

In other instances, as pallet truck 135 carries palletized load 164 up infeed ramp 102, palletized load 164 may be misaligned such that a lower right portion may contact guiding surface 178 and/or guiding edge 184. As guiding surface 178 and/or guiding edge 184 engages the lower right portion of pallet 162, palletized load 164 may rotate and/or shift to the left with respect to fork 136.

If misalignment persists after pallet 162 has proceeded past guiding surface 178 and guiding edge 184, the remaining misalignment may be reduced or eliminated by guiding surface 180. For example, if the lower right portion of pallet 162 is above guiding surface 180 as palletized load 164 is being lowered onto infeed conveyor 101, when the lower right portion makes contact with guiding surface 180, palletized load 164 will rotate and/or shift with respect to fork 136, such that the misalignment is reduced or eliminated.

It is also contemplated that guide rails 170 and 172 may cooperate to align palletized load 164. For example, guiding surface 174 and/or guiding edge 182 may exert a force on a lower left portion of pallet 162 (e.g., a corner and/or at least a portion of an edge), and guiding surface 178 and/or guiding edge 184 may exert a force on the lower right portion of pallet 162 (e.g., a corner and/or at least a portion of an edge), with both forces acting together to align pallet 162.

Additionally or alternatively, a bottom left portion of pallet 162 may be positioned vertically above guiding surface 176, and a bottom right portion of pallet 162 may be positioned vertically above guiding surface 180. As fork 136 is lowered, the bottom left portion of pallet 162 may come into contact with guiding surface 176 and/or the bottom right portion of pallet 162 may come into contact with guiding surface 180. As the bottom left portion of pallet 162 slides downward along guiding surface 176, and/or the bottom right portion of pallet 162 slides downward along guiding surface 180, guiding surface 176 and/or guiding surface 180 may force pallet 162 to rotate (clockwise or counterclockwise, depending on the orientation of pallet 162 relative to guiding surfaces 176 and 180) and/or shift (left or right, depending on the orientation of pallet 162 relative to guiding surfaces 176 and 180) with respect to fork 136. As pallet 162 is moved, the misalignment decreases, and may even be eliminated.

It is contemplated that, by engaging pallet 162 of palletized load 164 when palletized load 164 is misaligned, guide rails 170 and 172 may act as a funnel to direct palletized load 164 into alignment. Guiding surfaces 174 and 178 may funnel palletized load 164 away from the sides of the top or conveying surface of infeed conveyor 101 as palletized load 164 is carried by pallet truck 135 up infeed ramp 102 onto infeed conveyor 101. Guiding surfaces 176 and 180 may funnel palletized load 164 away from the side edges of the top or conveying surface of infeed conveyor 101 as palletized load 164 is deposited onto infeed conveyor by pallet truck 135.

Another embodiment of an infeed area 200 of a conveyorized wrapping system is shown in FIGS. 12-15. Infeed area 200 includes an infeed ramp 202. A top surface of infeed ramp 202 may form an angle $\theta_3$ with support surface 165. The exact value of angle $\theta_3$ may depend on a number of factors, including, for example, dimensions of a pallet supporting a palletized load, dimensions of a fork of a pallet truck, dimensions of an infeed conveyor in infeed area 200, and other variables. According to one exemplary embodiment, infeed ramp 202 may have an angle $\theta_3$ of between approximately 2 and 4 degrees. For example, if infeed ramp 202 has a length of approximately 60.6 inches, angle $\theta_3$ may be approximately 3.58 degrees. If infeed ramp 202 has a length of approximately 62.0 inches, angle $\theta_3$ may be approximately 2.4 degrees.

Infeed ramp 202 may not include a movable portion or guide bars, similar to those associated with infeed ramp 102. One reason for this is that, unlike in infeed area 100, infeed area 200 does not include a roller conveyor, and thus, preventing contact between wheel assemblies of a pallet truck and conveyor rollers, by aligning the pallet truck, is not required in infeed area 200. However, it should be understood that a movable portion and/or guide bars similar to those associated with infeed ramp 102 may be present in infeed ramp 202 to assist with aligning the pallet truck, if such alignment is found to be desirable. Such alignment may be desirable to, for example, prevent wheel assemblies 138 and 148 of pallet truck 135 from contacting drag chains 250, 252, and 254 of an infeed conveyor 201. This may ensure that drag chains 250, 252, and 254 do not damage wheel assemblies 138 and 148, or vice versa. Such alignment may also be desirable to assist with properly positioning palletized load 164 on infeed conveyor 201 (e.g., so that upstream and downstream faces of infeed conveyor 201 are substantially perpendicular to drag chains 250, 252, and 254) to achieve better wrapping and less film breaks. Another reason such alignment may be desirable is to ensure that palletized load 164 contacts as many of drag chains 250, 252, and 254 as possible, to ensure that infeed conveyor 201 can quickly and efficiently transport palletized load 164.

The top surface of ramp 202 may include one or more protrusions 222. Protrusion 222 may be sized and configured such that near the end of a step in which the fork of a pallet truck is extracted from a pallet supporting a palletized load, with the pallet resting on an infeed conveyor of the infeed area, protrusion 222 may engage a bottom surface of the fork as the fork exits from tunnels in the pallet so that the fork does not damage a bottom plate of the pallet near the entrance to the tunnels. It is contemplated that an upstream portion of protrusion 222 may be inclined at an angle relative to a top surface of infeed ramp 202 that is different than, or alternatively equal to, the angle at which the top surface of infeed ramp 202 is inclined relative to support surface 165. It is also contemplated that the downstream portion of protrusion 222 may have a decline with respect to support surface 165. For example, the angle of decline of protrusion 222 with respect to support surface 165 may be approximately 6.42 degrees. In one embodiment, the downstream portion of protrusion 222 may be formed by a cut-out adjacent a downstream end of infeed ramp 202. It should be understood that protrusion 222 may include features of any of the protrusions described in U.S. patent application Ser. No. 12/729,942, and may function in a similar manner.

Infeed area 200 also includes infeed conveyor 201. Infeed conveyor 201 may include drag chains 250, 252, and 254, each at least partially received in one or more channels 255 formed in a top surface of infeed conveyor 201. Drag chains 250, 252, and 254 may be sized such that a top portion of drag chains 250, 252, and 254 extend out of the one or more channels 255 to contact pallet 162. Drag chains 250, 252, and 254 may be driven to carry palletized load 164 downstream on infeed conveyor 201 by a drive mechanism 260. The top surface of infeed conveyor 201 may form an angle $\theta_4$ with support surface 165. Angle $\theta_4$ may be substantially equal to angle $\theta_3$. Alternatively, angle $\theta_4$ may be slightly different than angle $\theta_3$. As with angle $\theta_3$, the exact value of angle $\theta_4$ may depend on a number of factors, including, for example, dimensions of a pallet supporting a palletized load, dimensions of a fork of a pallet truck, dimensions of infeed ramp 202, and other variables. According to one exemplary embodiment, infeed conveyor 201 may have an angle $\theta_3$ of between approximately 2 and 4 degrees. For example, if infeed ramp 202 has a length of approximately 62.0 inches, angle $\theta_4$ may be approximately 2.4 degrees, and infeed conveyor 201 may have a pass height of approximately 3.25 inches. The pass height may be equal to a distance between support surface 165 and the top surface of infeed conveyor 201. If infeed ramp 202 has a length of 60.6 inches (along support surface 165), and infeed conveyor 201 has a length of approximately 97.5 inches (along support surface 165), angle $\theta_3$ and angle $\theta_4$ may be approximately 3.58 degrees and 2.50 degrees respectively, and infeed conveyor 201 may reach a height of approximately 7.5 inches at its downstream end adjacent the wrapping area. Other features of infeed conveyor 201 are similar to those described in U.S. patent application Ser. No. 12/729,942.

Infeed area 200 may also include guide rails 270 and 272. Guide rails 270 and 272 may guide pallet 162 as the palletized load 164 is carried over and/or lowered onto infeed conveyor 201 to help correct any misalignment before the palletized load 164 comes to rest on the top or conveying surface of infeed conveyor 201. Guide rails 270 and 272 may be made of wood, steel, or any other suitable materials, and surfaces of guide rails 270 and 272 may include a finish, a coating, an attached panel, an inlay, and/or any other suitable construction configured to reduce friction when coming into contact with pallet 162. Guide rails 270 and 272 may reach a height of approximately 8 inches above the top or conveying surface of infeed conveyor 201, may have a length approximately equal to the length of infeed conveyor 201, and may be angled with respect to support surface 165 in a manner similar to infeed conveyor 201.

By correcting or reducing the misalignment of palletized load 164 with infeed conveyor 201, guide rails 270 and 272 may ensure that palletized load 164 is positioned properly to achieve better wrapping and less downtime due to film breaks (i.e., positioned with upstream and downstream faces of palletized load 164 parallel to guide chains 250, 252, and 254. Guide rails 270 and 272 may also ensure that palletized load 164 engages as many of drag chains 250, 252, and 254 as possible, providing for more efficient (e.g., faster) conveying of palletized load 164.

Guide rail 270 may be provided on a first side of infeed conveyor 201 and infeed ramp 202. Guide rail 270 may include plates 273 and 275 and one or more supporting members 277 configured to support plates 273 and 275. Plate 273 may extend from the upstream end of infeed conveyor 201, and may be mounted on a top surface of infeed ramp 202. Plate 275 may extend along a first side of the top surface of infeed conveyor 201.

Guide rail 270 may include a guiding surface 274 (formed by a surface of plate 273) that is angled by an angle $\theta_{10}$ with respect to a substantially vertical plane extending substantially perpendicularly from a top surface of the infeed ramp 202, and a guiding surface 276 (formed by a surface of plate 275) that is angled by an angle $\theta_9$ with respect to a substantially vertical plane extending substantially perpendicularly from the top or conveying surface of the infeed conveyor 201. In one embodiment, angle $\theta_9$ may be approximately 30 degrees, and thus, guiding surface 276 may form an approximately 30 degree angle with respect to the substantially vertical plane. It is also contemplated that guiding surface 274 may form an angle $\theta_6$ with respect to guiding surface 276. In one embodiment, angle $\theta_6$ may be approximately 20 to 30 degrees.

Guide rail 272 may be the mirror image of guide rail 270, and may be mounted on a second side of infeed conveyor 201 and infeed ramp 202 opposite the first side. Guide rail 272 may include plates 279 and 281, one or more supporting members 283, and guiding surfaces 278 and 280 to guide pallet 162 in a manner similar to guide rail 270. It is contemplated that guide rails 270 and 272 may operate individually or together to funnel and align palletized load 164 in a manner similar to guide rails 170 and 172.

It should be understood that the present disclosure also encompasses infeed areas including components from any combination of infeed area 100, infeed area 200, and/or the infeed areas described in U.S. patent application Ser. No. 12/729,942. For example, it is contemplated that the infeed ramp of one infeed area may be used in place of the infeed ramp of another infeed area, and/or the infeed conveyor of one infeed area may be used in place of the infeed conveyor of another infeed area.

The outfeed area of a conveyorized wrapping system may include an outfeed ramp and an outfeed conveyor for receiving a wrapped palletized load from the wrapping area. The outfeed ramp and the outfeed conveyor may extend in an inclined manner toward the wrapping area. The outfeed ramp and the outfeed conveyor may be sized and configured so that a pallet truck can be driven onto the outfeed ramp, and a fork of the pallet truck can be inserted into the pallet of the wrapped palletized load. After insertion, the pallet truck may lift the wrapped palletized load and drive away from the outfeed area to deliver the wrapped palletized load to another location. Additional features of the outfeed ramp and the outfeed conveyor are described in U.S. patent application Ser. No. 12/729,942.

The outfeed area may be a mirror image of the infeed area, and thus, the components of the outfeed area may be similar to those described with respect to the infeed area.

The wrapping area of a conveyorized wrapping system may include a wrapping apparatus and a conveyor assembly. The wrapping area may include a wrapping area conveyor, defining a wrapping surface on which palletized load 164 may rest. A distal or downstream end of either of infeed conveyor 101 and 201 may meet a proximal or upstream end of the wrapping area conveyor. In order to ease the transition of palletized load 164 as it moves from the infeed conveyor, which is inclined, to the wrapping area conveyor, which is substantially level, one or more round off rollers, or any other suitable round off section, may be placed where the infeed conveyor and the wrapping area conveyor meet. The wrapping area conveyor may include a frame with two side rails that support rotatable rollers. The rollers may include sprockets coupled to a drive mechanism configured to rotate the rollers. The rotation of the rollers may transport palletized load 164 through the wrapping area in the direction of the outfeed area.

While palletized load 164 is in the wrapping area, it may be held stationary by preventing the rollers from rotating, allowing the wrapping apparatus to perform the wrapping process on a stationary load. Once the palletized load 164 is wrapped, the wrapping area conveyor may convey the palletized load 164 toward the outfeed conveyor of the outfeed area. In order to ease the transition of the palletized load 164 as it moves away from the wrapping area conveyor, which is substantially level, to the outfeed conveyor, which is inclined, one or more round off rollers, or any other suitable round off section, may be placed where the wrapping area conveyor and the outfeed conveyor meet or merge Additional features of the wrapping area and outfeed area are described in U.S. patent application Ser. No. 12/729,942, U.S. Patent Application Publication No. 2007/0204565 A1, entitled "METHOD AND APPARATUS FOR METERED PRE-STRETCH FILM DELIVERY," filed Feb. 23, 2007, and published Sep. 6, 2007, and U.S. Pat. No. 5,056,653, entitled "ROLLER CONVEYOR," and issued Oct. 15, 1991, all of which are incorporated herein by reference in their entirety.

A method of use of an exemplary conveyorized wrapping system will now be described.

Figure 1:
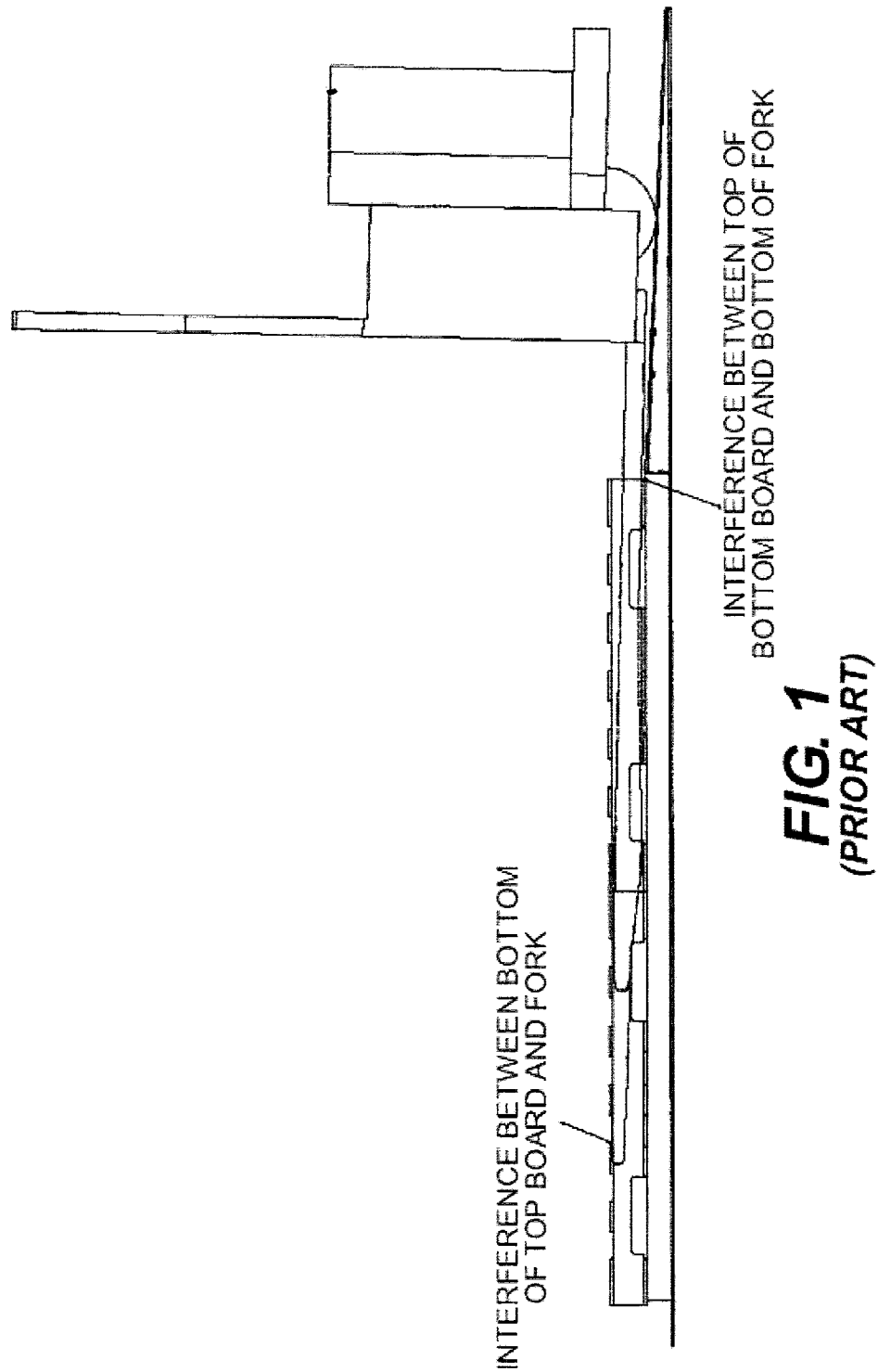
FIG. 1 shows a side view of a conventional pallet truck and conveyor.
Figure 2:
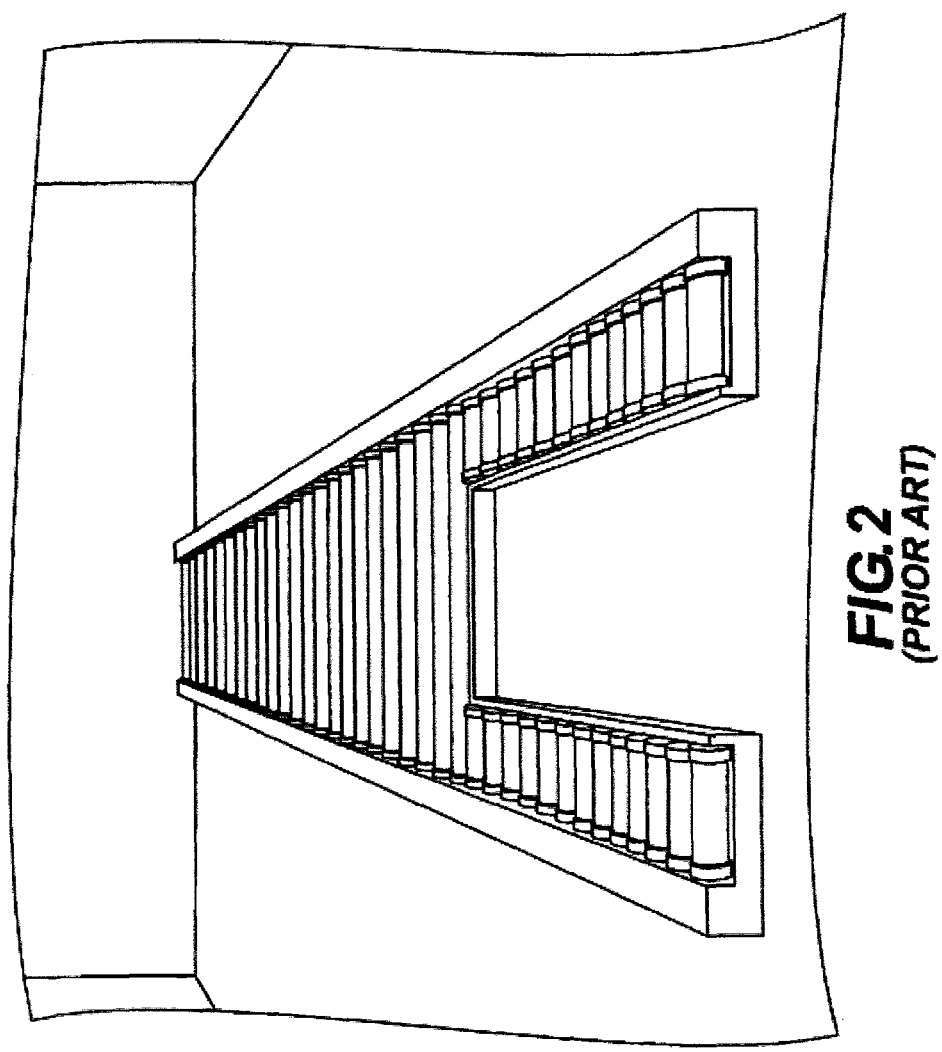
FIG. 2 shows a perspective view of a conventional conveyor.

A picker in a distribution center or other facility may build palletized load 164. To build palletized load 164, the picker may drive pallet truck 135 as it supports pallet 162 on fork 136. Tines 144 and 146 of fork 136 may extend through tunnels 166 and 168 in pallet 162, and wheel assemblies 138 and 148 may be extended through a gap 169 in a bottom plate 167 of pallet 162 to engage support surface 165 (see the extended state shown in phantom in FIG. 2) so that upper surfaces of tines 144 and 146 lift pallet 162 into a raised position. The picker may drive pallet truck 135 between rows of products and pick the necessary products to form palletized load 164.

To position palletized load 164 in an infeed area, such as infeed area 100, the picker may direct pallet truck 135 toward a proximal or upstream end of infeed ramp 102. Wheel assemblies 138 and 148, and then a drive wheel assembly 149, may ride over the top surface of infeed ramp 102 as pallet truck 135 carries palletized load 164 above a proximal end of infeed conveyor 101. Plate 116 and guide bars 134 and 156 may help adjust the alignment of fork 136 of pallet truck 135 as palletized load 164 is brought into position for placement on infeed conveyor 101. For example, if pallet truck 135 is too far to the left, guide bar 134 may exert a force on wheel assembly 138 toward the right. The force of friction between wheel assemblies 138 and 148 and plate 116 prevent wheel assemblies 138 and 148 from sliding toward the right on plate 116 even though guide bar 134 is exerting a force on wheel assembly 138 in that direction, thus forcing plate 116, with wheel assemblies 138 and 148 thereon, toward the right (i.e., toward second position 126). If pallet truck 135 is too far to the right, guide bar 156 may exert a force on wheel assembly 148 toward the left, forcing plate 116, with wheel assemblies 138 and 148 thereon, toward the left (i.e., toward third position 128). When wheel assemblies 138 and 148 exit off of plate 116, biasing assembly 120 biases plate 116 back to home position 124.

Guiding surfaces 174 and 178 and/or guiding edges 182 and 184 of guide rails 170 and 172 may help to funnel and align palletized load 164 as it is brought into position for placement on infeed conveyor 101. For example, initially, guiding surface 174, guiding surface 178, guiding edge 182, and/or guiding edge 184, may engage lower portions of pallet 162 to rotate and/or shift palletized load 164 with respect to fork 136 of pallet truck 135. If misalignment persists after pallet 162 has proceeded past guiding edges 182 and 184, guiding surfaces 176 and/or 180 may engage lower portions of pallet 162 as pallet 162 is lowered by pallet truck 135 onto infeed conveyor 101 to rotate and/or shift palletized load 164 with respect to fork 136, thus reducing or eliminating any remaining misalignment.

Retracting wheel assemblies 138 and 148 may lower tines 144 and 146, lowering palletized load 164 onto the top or conveying surface of infeed conveyor 101. Guiding surfaces 176 and 180 of guide rails 170 and 172 may help to funnel and align load 164 as it is lowered onto infeed conveyor 101 to ensure that load 164 is properly positioned thereon for conveying to the wrapping area. Tines 144 and 146 may come to rest on the top surface of bottom plate 167 of pallet 162. Pallet truck 135 may back away from infeed ramp 102 to extract tines 144 and 146 from tunnels 166 and 168. As pallet truck 135 backs out, a portion of the bottom surfaces of tines 144 and 146 may slide along the top surface of bottom plate 167 of pallet 162, while a clearance may be provided between the top surfaces of tines 144 and 146 and the bottom surface of a top plate 171, so as to avoid binding or wedging fork 136 in tunnels 166 and 168. The clearance may be maintained during the initial phase of the extraction where drive wheel assembly 149 of pallet truck 135 is on the top surface of infeed ramp 102. When drive wheel assembly 149 passes from infeed ramp 102 to support surface 165, the clearance may vary, but tines 144 and 146 may nevertheless remain free from binding engagement with pallet 162 due to the angled orientations of infeed conveyor 101 and infeed ramp 102. As tip portions of tines 144 and 146 approach exiting tunnels 166 and 168, protrusion 122 may engage the bottom surfaces of tines 144 and 146 to keep tines 144 and 146 from damaging bottom plate 167 of pallet 162 as the tip portions of tines 144 and 146 are fully extracted. Details regarding the movement of the pallet truck and its tines during delivery of a palletized load to an infeed area, movement of the pallet truck and its tines during withdrawal of the tines from the pallet, and aspects of the clearance are described in U.S. patent application Ser. No. 12/729,942.

Palletized load 164 may be positioned on infeed conveyor 101 while another palletized load is transported by infeed conveyor 101 toward the wrapping area, while another load is being wrapped in the wrapping area, while a wrapped palletized load is being transported by the outfeed conveyor toward the outfeed ramp, and/or while a wrapped load is awaiting pick up by pallet truck 135 at the outfeed ramp.

Palletized load 164 may be transported toward the wrapping area by the infeed conveyor 101. This transporting may be accomplished by activating one or more drive mechanisms 160 to rotate rollers 150, 152, and 154 to propel palletized load 164. Once palletized load 164 is positioned in the wrapping area, relative rotation may be provided between palletized load 164 and a packaging material dispensing assembly. As relative rotation is being provided, packaging material may be wrapped around the sides of the palletized load 164. The packaging material dispenser assembly may be driven vertically along the sides of palletized load 164, causing packaging material to be wrapped spirally about palletized load 164.

Once palletized load 164 has been wrapped, one or more drive mechanisms may rotate rollers in the wrapping area conveyor to transport the newly wrapped palletized load 164 from the wrapping area to the outfeed conveyor. One or more drive mechanisms may rotate rollers or drive drag chains to transport palletized load 164 along the outfeed conveyor. It is also contemplated that palletized load 164 may move down the outfeed conveyor due to gravitational forces. In that case, the rollers may rotate freely, or may be driven at a speed slower than that of free rotation to prevent palletized load 164 from picking up excessive speed.

Palletized load 164 may be transported to a distal or downstream end of the outfeed conveyor. A pallet truck may be directed toward the distal end of the outfeed ramp, and may be driven up the outfeed ramp to insert a fork of the pallet truck into tunnels in pallet 162. Afterwards, the pallet truck may be backed away from the outfeed ramp and maneuvered. Additional details regarding the transporting of palletized loads to the wrapping area, wrapping of palletized loads in the wrapping area, transporting of wrapped palletized loads into and through the outfeed area, and picking up of wrapped palletized loads from the outfeed area by a pallet truck are described in U.S. patent application Ser. No. 12/729,942.

To position palletized load 164 in an infeed area, such as infeed area 200, the picker may direct pallet truck 135 toward a proximal or upstream end of infeed ramp 202. Wheel assemblies 138 and 148, and then drive wheel assembly 149, may ride over the top surface of infeed ramp 202, as pallet truck 135 carries palletized load 164 above a proximal end of infeed conveyor 201.

Guiding surfaces 274 and 278 and/or guiding edges 282 and 284, of guide rails 270 and 272, may help to funnel and align palletized load 164 as it is brought into position for placement on infeed conveyor 201. For example, initially, guiding surface 274, guiding surface 278, guiding edge 282, and/or guiding edge 284, may engage lower portions of pallet 162 to rotate and/or shift palletized load 164 with respect to fork 136 of pallet truck 135.

Wheel assemblies 138 and 148 may pass from the top surface of infeed ramp 202 onto the top or conveying surface of infeed conveyor 201, and may continue along the top or conveying surface of infeed conveyor 201 on surfaces between drag chain assemblies 250, 252, and 254. Retracting wheel assemblies 138 and 148 may lower tines 144 and 146, lowering palletized load 164 onto the top or conveying surface of infeed conveyor 201. Guiding surfaces 276 and 280 of guide rails 270 and 272 may help to funnel and align load 164 as it is lowered onto infeed conveyor 201 to ensure that load 164 is properly positioned thereon for conveying to the wrapping area. For example, if misalignment persists after pallet 162 has proceeded past guiding edges 282 and 284, guiding surfaces 276 and/or 280 may engage lower portions of pallet 162 as pallet 162 is lowered by pallet truck 135 onto infeed conveyor 101 to rotate and/or shift palletized load 164 with respect to fork 136, thus reducing or eliminating an remaining misalignment.

Tines 144 and 146 may come to rest on the top surface of bottom plate 167 of pallet 162. Pallet truck 135 may back away from infeed ramp 202 to extract tines 144 and 146 from tunnels 166 and 168. As pallet truck 135 backs out, a portion of the bottom surfaces of tines 144 and 146 may slide along the top surface of bottom plate 167 of pallet 162, while a clearance may be provided between the top surfaces of tines 144 and 146 and the bottom surface of top plate 171, so as to avoid binding or wedging fork 136 in tunnels 166 and 168. The clearance may be maintained during the initial phase of the extraction where drive wheel assembly 149 of pallet truck 135 is on the top surface of infeed ramp 202. When drive wheel assembly 149 passes from infeed ramp 202 to support surface 165, the clearance may vary, but tines 144 and 146 may nevertheless remain free from binding engagement with pallet 162. As tip portions of tines 144 and 146 approach exiting tunnels 166 and 168, protrusion 222 may engage the bottom surfaces of tines 144 and 146 to keep tines 144 and 146 from damaging bottom plate 167 of pallet 162 as the tip portions of tines 144 and 146 are fully extracted. Details regarding the movement of the pallet truck and its tines during delivery of a palletized load to an infeed area, movement of the pallet truck and its tines during withdrawal of the tines from the pallet, and aspects of the clearance are described in U.S. patent application Ser. No. 12/729,942.

Palletized load 164 may be positioned on infeed conveyor 201 while another palletized load is transported by infeed conveyor 201 toward the wrapping area, while another load is being wrapped in the wrapping area, while a wrapped palletized load is being transported by the outfeed conveyor toward the outfeed ramp, and/or while a wrapped load is awaiting pick up by pallet truck 135 at the outfeed ramp.

Palletized load 164 may be transported toward the wrapping area by the infeed conveyor 201. This transporting may be accomplished by activating a drive mechanism 260 to drive drag chain assemblies 250, 252, and 254 to propel palletized load 164.

Steps associated with conveying palletized load 164 into the wrapping area, wrapping palletized load 164, conveying palletized load 164 to the outfeed area, and picking up palletized load 164 with a pallet truck from the outfeed area, are similar for infeed areas 100 and 200. Additional details regarding the transporting of palletized loads to the wrapping area, wrapping of palletized loads in the wrapping area, transporting of wrapped palletized loads into and through the outfeed area, and picking up of wrapped palletized loads from the outfeed area by a pallet truck are described in U.S. patent application Ser. No. 12/729,942.

It is also contemplated that the picker may build multiple palletized loads. Each of the palletized loads may be built on its own pallet, and those pallets may be supported one in front of the other on tines 144 and 146 of pallet truck 135. The pallets and their corresponding loads may be supported, raised, lowered, and maneuvered using pallet truck 135 in a manner similar to that of palletized load 164. Method steps for loading, wrapping, and unloading multiple palletized loads may be similar to those described above for palletized load 164.

Other embodiments of the disclosure will be apparent to those skilled in the art from consideration of the specification and practice of the invention disclosed herein. It is intended that the specification and examples be considered as exemplary only, with a true scope and spirit of the disclosure being indicated by the following claims.

What is claimed is:

1. An apparatus for transferring a palletized load between a pallet truck and a load wrapping surface, comprising:
    an inclined ramp configured to support at least a portion of the pallet truck; and
    an inclined conveyor adjacent to the ramp, the conveyor including a conveying surface configured to support the palletized load and including at least one drag chain assembly configured to convey the palletized load between the ramp and the load wrapping surface.

2. The apparatus of claim 1, wherein the at least one drag chain assembly includes a first drag chain, a second drag chain, and a third drag chain.

3. The apparatus of claim 1, further including at least one guide rail extending alongside at least a portion of the conveying surface, the at least one guide rail being configured to orient the palletized load with respect to the conveying surface when the palletized load comes into contact with the at least one guide rail.

4. The apparatus of claim 3, wherein the at least one guide rail includes a guiding surface, the guiding surface being angled with respect to a vertical plane.

5. The apparatus of claim 4, wherein the guiding surface forms an approximately 30 degree angle with the vertical plane.

6. The apparatus of claim 3, wherein the at least one guide rail is angled relative to a horizontal support surface.

7. The apparatus of claim 3, wherein the at least one guide rail includes a first guiding surface configured to orient the palletized load with respect to the conveying surface when the palletized load comes into contact with the first guiding surface during movement of the palletized load from the ramp to above the conveyor.

8. The apparatus of claim 3, wherein the at least one guide rail includes a second guiding surface configured to orient the palletized load on the conveyor as the palletized load is lowered onto the conveyor and comes into contact with the second guiding surface.

9. The apparatus of claim 3, wherein the at least one guide rail includes a first guide rail extending alongside at least a portion of a first side of the conveying surface, and a second guide rail extending alongside at least a portion of a second side of the conveying surface.

10. The apparatus of claim 9, wherein an orientation of the first guide rail is a mirror image of an orientation of the second guide rail.

11. A conveyorized wrapping system, comprising:
    an infeed area including:
        an inclined ramp configured to support at least a portion of the pallet truck, and
        an inclined conveyor adjacent to the inclined ramp, the inclined conveyor including a conveying surface configured to support a load, the conveying surface including at least one drag chain assembly configured to convey the load between the inclined ramp and a wrapping area; and the wrapping area including a wrapping apparatus configured to wrap the load with packaging material.

12. The conveyorized wrapping system of claim 11, wherein the wrapping area further includes a load wrapping surface configured to support the load during wrapping.

13. The conveyorized wrapping system of claim 12, wherein the wrapping area further includes a second conveyor configured to convey the load between the inclined conveyor and the load wrapping surface.

14. The conveyorized wrapping system of claim 12, wherein the at least one drag chain assembly includes a first drag chain, a second drag chain, and a third drag chain.

15. The conveyorized wrapping system claim 11, further including at least one guide rail extending alongside at least a portion of the conveying surface, the at least one guide rail being configured to guide the load into proper orientation with respect to the conveying surface when the load comes into contact with the at least one guide rail.

* * * * *

UNITED STATES PATENT AND TRADEMARK OFFICE
CERTIFICATE OF CORRECTION

PATENT NO. : 8,474,223 B2  
APPLICATION NO. : 12/848851  
DATED : July 2, 2013  
INVENTOR(S) : Patrick R. Lancaster, III et al.

It is certified that error appears in the above-identified patent and that said Letters Patent is hereby corrected as shown below:

In the Specification:

Column 1,
Line 12 reads "systems, and more particularly, to" and should read
-- systems and, more particularly, to --.

Column 7,
Lines 50-51 reads "The force of friction between . . . prevent" and should read -- The force of friction between . . . prevents --.

Column 13,
Line 19 reads "(i.e., positioned with upstream and downstream faces of palletized load 164 parallel to guide chains 250, 252, and 254." and should read -- (i.e., positioned with upstream and downstream faces of palletized load 164 parallel to guide chains 250, 252, and 254). --.

Column 17,
Lines 12-13 reads "thus reducing or eliminating an remaining misalignment" and should read -- thus reducing or eliminating any remaining misalignment --.

In the Claims:

Claim 15, Column 19
Line 13 reads "The conveyorized wrapping system claim" and should read -- The conveyorized wrapping system of claim --.

Signed and Sealed this
Fifteenth Day of October, 2013

Teresa Stanek Rea
*Deputy Director of the United States Patent and Trademark Office*